(12) United States Patent
Moeller et al.

(10) Patent No.: US 11,241,640 B2
(45) Date of Patent: Feb. 8, 2022

(54) SOLVENT RESERVOIR FILTERS, SYSTEMS AND METHODS

(71) Applicant: Waters Technologies Corporation, Milford, MA (US)

(72) Inventors: Mark W. Moeller, Norton, MA (US); William B. Clark, North Attleboro, MA (US)

(73) Assignee: WATERS TECHNOLOGIES CORPORATION, Milford, MA (US)

( * ) Notice: Subject to any disclaimer, the term of this patent is extended or adjusted under 35 U.S.C. 154(b) by 67 days.

(21) Appl. No.: 16/449,738

(22) Filed: Jun. 24, 2019

(65) Prior Publication Data

US 2020/0023295 A1     Jan. 23, 2020

Related U.S. Application Data

(60) Provisional application No. 62/700,430, filed on Jul. 19, 2018.

(51) Int. Cl.
| | |
|---|---|
| *B01D 29/05* | (2006.01) |
| *B01D 39/12* | (2006.01) |
| *B01D 29/52* | (2006.01) |
| *B01D 15/16* | (2006.01) |

(52) U.S. Cl.
CPC ............ *B01D 29/05* (2013.01); *B01D 15/16* (2013.01); *B01D 29/52* (2013.01); *B01D 39/12* (2013.01)

(58) Field of Classification Search
CPC ........ B01D 29/05; B01D 29/52; B01D 39/12; B01D 15/125; B01D 15/16; B01D 2313/08; B01L 3/502; B01L 2200/0668; B01L 2300/0681; B01L 2300/0832; B01L 3/527; B01L 2200/0647; G01N 30/14; G01N 30/34; G01N 2030/146; G01N 2035/00475

See application file for complete search history.

(56) References Cited

U.S. PATENT DOCUMENTS

| | | | | |
|---|---|---|---|---|
| 5,366,620 | A * | 11/1994 | Schick ................. | G01N 1/4077 210/198.2 |
| 6,923,908 | B1 * | 8/2005 | Thompson ........... | B01D 39/083 210/188 |
| 7,373,825 | B2 * | 5/2008 | Fennington, Jr. ..... | F16L 41/008 73/700 |

(Continued)

OTHER PUBLICATIONS

Invitation to Pay Additional Fees for International Application No. PCT/US2019/038649, dated Oct. 1, 2019.

(Continued)

*Primary Examiner* — Dirk R Bass
(74) *Attorney, Agent, or Firm* — Schmeiser, Olsen & Watts LLP; Victor J. Baranowski

(57) ABSTRACT

A solvent reservoir filter for a liquid chromatograph system includes a first screen extending in a first plane, the first screen configured to filter solvent received through the first screen, a second screen extending in a second plane that is parallel to the first plane, the second screen configured to filter solvent received through the second screen, a main body extending between and connecting the first screen and the second screen, and a fluid outlet configured to expel solvent filtered by the first and second screens from the solvent reservoir filter. Methods of use and assembly of the solvent reservoir filter for a liquid chromatograph system are further disclosed.

16 Claims, 19 Drawing Sheets

(56) References Cited

U.S. PATENT DOCUMENTS

| | | | |
|---|---|---|---|
| 8,562,827 B2 * | 10/2013 | Salomonsson | G01N 30/603 210/198.2 |
| 2005/0160801 A1 | 7/2005 | Brumboiu et al. | |
| 2007/0079649 A1 | 4/2007 | Nauseda et al. | |
| 2017/0165591 A1 | 6/2017 | Jackson et al. | |

OTHER PUBLICATIONS

International Search Report and the Written Opinion for International Application No. PCT/US2019/038649, dated Nov. 29, 2019.
International Preliminary Report on Patentability in PCT/US2019/038649 dated Jan. 28, 2021.

* cited by examiner

SOLVENT RESERVOIR FILTERS, SYSTEMS AND METHODS

RELATED APPLICATIONS

This application is a non-provisional patent application claiming priority to U.S. Provisional Patent Application No. 62/700,430, filed Jul. 19, 2018, entitled "Solvent Reservoir Filters, System and Methods," which is incorporated herein by reference.

FIELD OF THE INVENTION

The invention relates generally to liquid chromatography systems. More particularly, the invention relates to liquid chromatography systems including solvent reservoir filters, and associated methods of use and assembly thereof.

BACKGROUND

Chromatography is a set of techniques for separating a mixture into its constituents. For instance, in a liquid chromatography system, a pump takes in and delivers a mixture of liquid solvents to a sample manager, where an injected sample awaits its arrival. The mobile phase, comprised of a sample dissolved in a mixture of solvents, passes to a column, referred to as the stationary phase. By passing the mixture through the column, the various components in the sample separate from each other at different rates and thus elute from the column at different times. A detector receives the elution from the column and produces an output from which the identity and quantity of the analysis may be determined.

Solvent reservoirs may include a container filled with the solvent. A tube may extend into the container for transporting the solvent to the liquid chromatography system. Particulates may be found within the solvent reservoir that would create undesirable effects if those particulates entered into the liquid chromatography system through the tube. As such, on the end of the tube is typically disposed a filter.

Particulates pose significant risk to the robustness and accuracy of chromatography instrumentation. With the development of high performance liquid chromatography (UPLC) instruments and the use of small bore tubing and miniaturized components, the UPLC system has become more vulnerable to problems stemming from particulates being found in chromatographic fluid paths. Particulates can be removed from fluidic paths using filters. Current filters are made by sintering and have ill-defined pore size distribution resulting in particulates passing through the filter that are either larger or smaller than the purported pore size of the filter. These particulates often get trapped and accumulate inside the tortuous pores of the filter. Thus, it is common for solvent reservoir filters to become clogged as a result of these deficiencies and through long term use. If left unreplaced, clogged filters could negatively impact pressure and other conditions in LC systems.

Thus, improved liquid chromatography systems including solvent reservoir filters, and associated methods of use and assembly thereof, would be well received in the art.

SUMMARY

In one embodiment, a solvent reservoir filter for a liquid chromatography system comprises: a first screen extending in a first plane, the first screen configured to filter solvent received through the first screen; a second screen extending in a second plane that is parallel to the first plane, the second screen configured to filter solvent received through the second screen; a main body extending between and connecting the first screen and the second screen; and a fluid outlet configured to expel solvent filtered by the first and second screens from the solvent reservoir filter.

Additionally or alternatively, the first screen extends in a first plane, wherein the second screen extends in a second plane that is parallel or substantially parallel to the first plane.

Additionally or alternatively, the first screen is circular in shape, wherein the second screen is circular in shape, and wherein the main body is cylindrical in shape.

Additionally or alternatively, the first screen and the second screen each comprise woven wire.

Additionally or alternatively, the fluid outlet is a tube receiving interface extending from an outer surface of the main body into the main body.

Additionally or alternatively, the tube receiving interface includes at least one barb configured to attach an outlet tube to the fluid outlet.

Additionally or alternatively, the main body further comprises a first shear joint extending about a circumference of the main body, the first shear joint having a first portion and a second portion compressed with a press-fit to retain the first screen between the first and second portions, wherein the main body further comprises a second shear joint extending about the circumference, the second shear joint having a third portion and a fourth portion compressed with a press-fit to retain the first screen the third and fourth portions.

Additionally or alternatively, the main body further includes a first shelf located a distance behind the first screen and a second shelf located the distance behind the second screen.

Additionally or alternatively, the main body further includes an internal fluidic passage extending perpendicular to each of the first and second screens, the internal fluidic passage extending at a location that is off-center relative from a center of each of the first and second screens.

Additionally or alternatively, the internal fluidic passage is located proximate a first side of an outer surface of the main body, and wherein the fluid outlet is a tube receiving interface extending within the main body from a second side of the outer surface, the second side located opposite the first side.

Additionally or alternatively, the entirety of the main body is made of a single material.

Additionally or alternatively, compression of the first and second integrated shear joints is configured to permanently break the shear joints into the press-fit.

In another embodiment, a method of filtering solvent in a liquid chromatography system, the method comprises: providing a solvent reservoir containing a solvent; providing a solvent reservoir filter into the solvent reservoir, the solvent reservoir filter comprising: a first screen extending in a first plane; a second screen extending in a second plane that is parallel to the first plane; a main body extending between and connecting the first screen and the second screen; and a fluid outlet; attaching a tube to the fluid outlet such that the tube extends out of the solvent reservoir and is connected to a liquid chromatography system; filtering, by each of the first and second screen, the solvent; receiving, by a cavity defined by the main body, the filtered solvent; expelling, by the fluid outlet through the tube, the filtered solvent from the solvent reservoir filter.

Additionally or alternatively, the first screen extends in a first plane, and wherein the second screen extends in a second plane that is parallel or substantially parallel to the first plane.

Additionally or alternatively, the provided solvent reservoir filter further comprises: an internal fluidic passage extending perpendicular to each of the first and second screens, and the method further comprises: positioning the solvent reservoir filter within the solvent reservoir such that the internal fluidic passage is located closer to a bottom of the solvent reservoir than a center of each of the first and second screens.

Additionally or alternatively, the method further comprises resting the solvent reservoir filter against a bottom of the solvent reservoir such that the main body contacts the bottom, and such that the first screen and the second screen do not contact the bottom.

Additionally or alternatively, the attaching the tube to the fluid outlet further includes: providing a tube insertion tool comprising: a hinge; a first portion including a first channel; and a second portion hingedly attached to the first portion with the hinge, the second portion including a second channel, wherein when the hinge of the tube insertion tool is in a closed state, the first and second channel align to form a single opening through which to receive a length of the tube, wherein at least a portion of the first and second channel has a smaller dimension than the tube; receiving the tube within the first and second channels when the hinge is in the closed state; gripping the tube with the smaller dimension of the channel; and pushing the received and gripped tube into the fluid outlet by pushing the tube insertion tool.

In another embodiment, a method of assembling a solvent reservoir filter for a liquid chromatography system, the method comprises: providing a main body including a first integrated shear joint extending about an outer perimeter of the main body, the first integrated shear joint including a first portion and a second portion; providing a first screen; inserting the first screen into the first integrated shear joint between the first portion and the second portion of the first integrated shear joint; and compressing the first portion and the second portion of the first integrated shear joint to retain the first screen between the first portion and the second portion of the first integrated shear joint.

Additionally or alternatively, the main body further includes a second integrated shear joint extending about an outer perimeter of the main body, the second integrated shear joint including a first portion and a second portion, and the method further comprises: providing a second screen; inserting the second screen into the second integrated shear joint between the first portion and the second portion of the second integrated shear joint; and compressing the first portion and the second portion of the second integrated shear joint to retain the second screen between the first portion and the second portion of the second integrated shear joint.

Additionally or alternatively, the method further comprises breaking apart, during the compressing, the first portion from the second portion.

Additionally or alternatively, the compressing of the first and second portions of each of the first and second integrated shear joints occurs simultaneously and is performed by a compression press configured to compress the first and second integrated shear joints at a predetermined pressure.

In another embodiment, a liquid chromatography system comprises: a solvent delivery system including: a solvent reservoir; a solvent reservoir filter comprising: a first screen extending in a first plane, the first screen configured to filter solvent received through the first screen; a second screen extending in a second plane that is parallel to the first plane, the second screen configured to filter solvent received through the second screen; a main body extending between and connecting the first screen and the second screen; and a fluid outlet configured to expel solvent filtered by the first and second screens from the solvent reservoir filter; and a tube extending into the fluid outlet configured to receive solvent filtered by the solvent reservoir filter; a sample delivery system in fluidic communication with solvent delivery system; a liquid chromatography column located downstream from the solvent delivery system and the sample delivery system; and a detector located downstream from the liquid chromatography column.

BRIEF DESCRIPTION OF THE DRAWINGS

The above and further advantages of this invention may be better understood by referring to the following description in conjunction with the accompanying drawings, in which like reference numerals indicate like elements and features in the various figures. For clarity, not every element may be labeled in every figure. The drawings are not necessarily to scale, emphasis instead being placed upon illustrating the principles of the invention.

DETAILED DESCRIPTION

Reference in the specification to "one embodiment" or "an embodiment" means that a particular, feature, structure or characteristic described in connection with the embodiment is included in at least one embodiment of the teaching. References to a particular embodiment within the specification do not necessarily all refer to the same embodiment.

The present teaching will now be described in more detail with reference to exemplary embodiments thereof as shown in the accompanying drawings. While the present teaching is described in conjunction with various embodiments and examples, it is not intended that the present teaching be limited to such embodiments. On the contrary, the present teaching encompasses various alternatives, modifications and equivalents, as will be appreciated by those of skill in the art. Those of ordinary skill having access to the teaching herein will recognize additional implementations, modifications and embodiments, as well as other fields of use, which are within the scope of the present disclosure as described herein.

Figure 1:
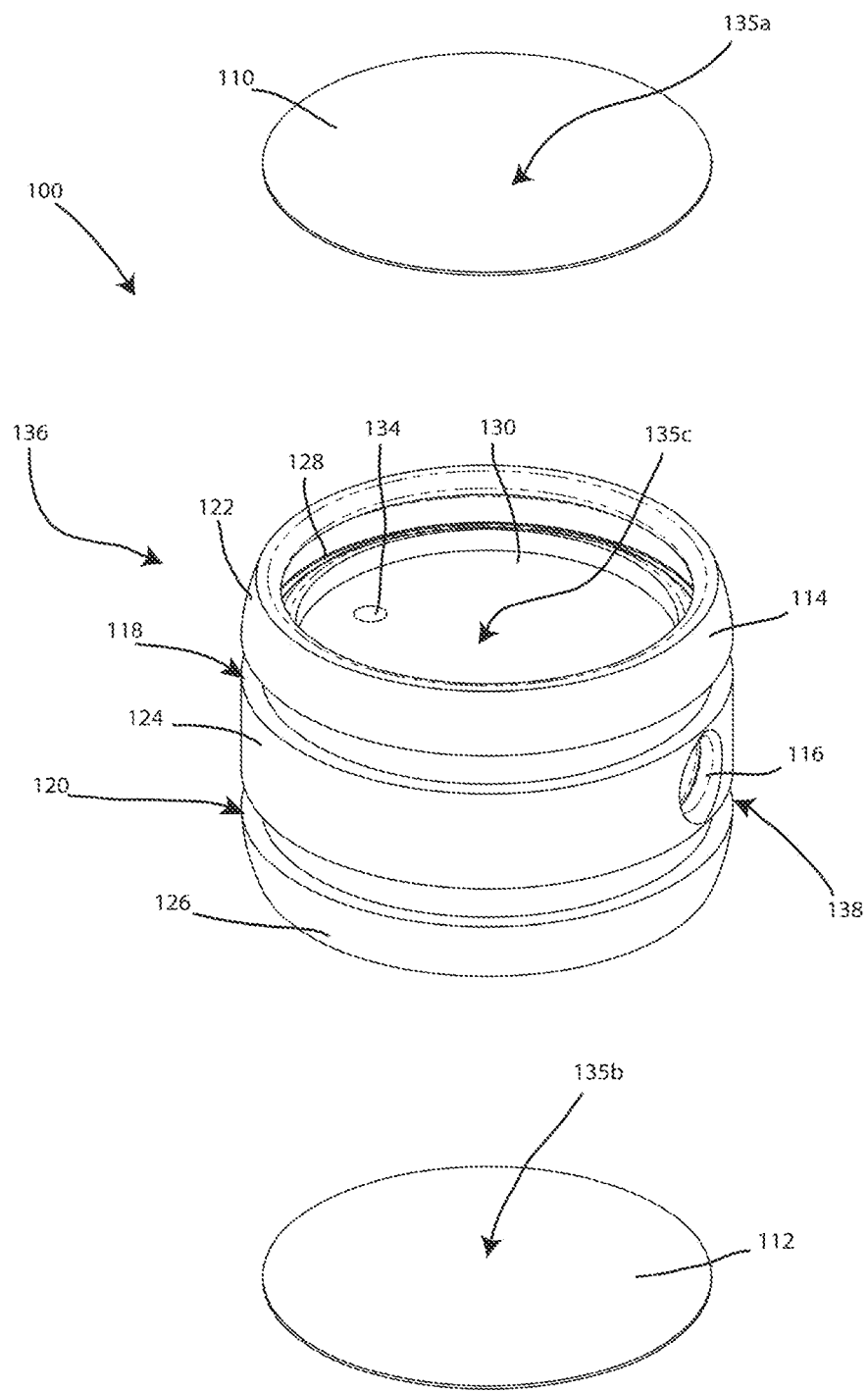
FIG. 1 depicts an exploded view of a solvent reservoir filter, in accordance with one embodiment.
Figure 17:
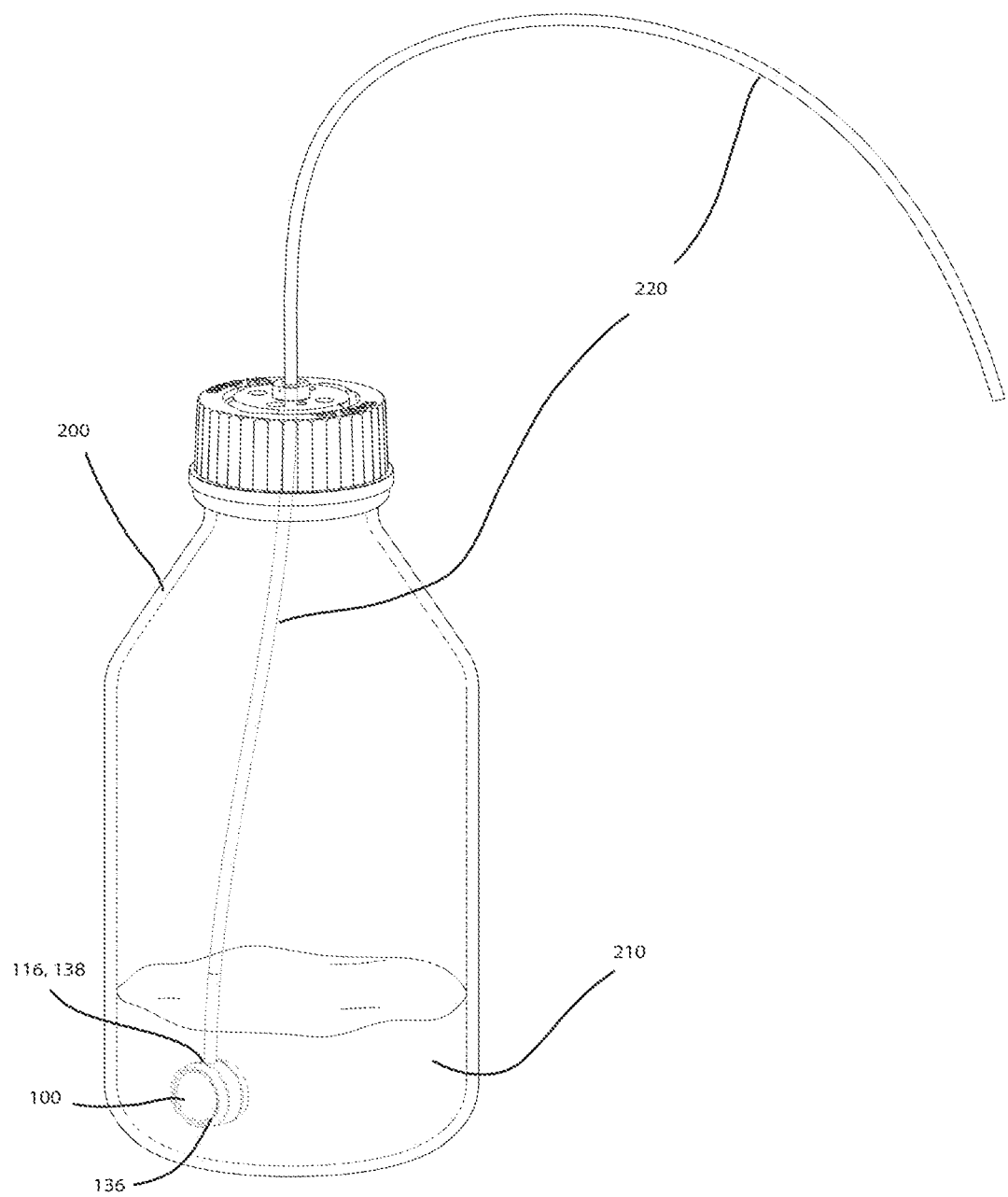
FIG. 17 depicts a perspective view of the solvent reservoir filter of FIG. 1 disposed within a solvent reservoir, in accordance with one embodiment.
Figure 18:
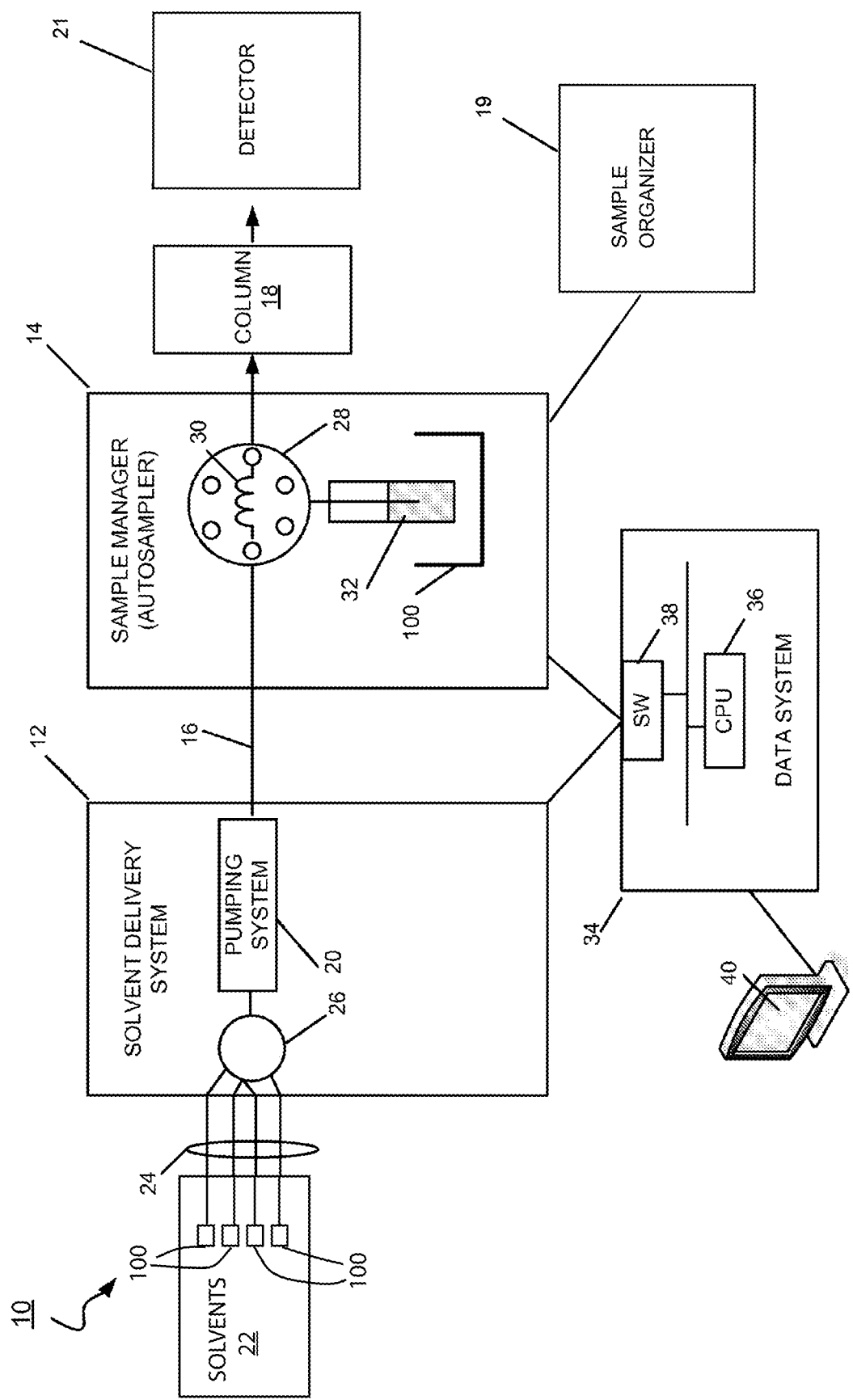
FIG. 18 depicts a schematic view of a liquid chromatography system that includes a solvent delivery system including the solvent reservoir filter of FIG. 1, in accordance with one embodiment.

FIG. 1 depicts an exploded view of a solvent reservoir filter 100, in accordance with one embodiment. The solvent reservoir filter 100 includes a first screen 110, a second screen 112, and a main body 114. The main body 114 may include a fluid outlet 116 configured to expel solvent filtered by the first and second screens 110, 112 from the solvent reservoir filter 100. The fluid outlet 116 may be configured to attachably receive a tube or other fluidic channel. The received tube may be configured to transport solvent from a solvent reservoir to a liquid chromatography system or method when the solvent reservoir filter 100 is placed, positioned or otherwise located within the solvent reservoir, as shown in FIGS. 17 and 18 and described herein below. Thus, the fluid outlet 116 may be configured to expel solvent filtered by the first and second screens 110, 112 from the solvent reservoir filter 100.

The first and second screens 110, 112 are each shown as circular shaped filters. Similarly, the main body 114 is shown with a circular cross section in the plane of the screens 110, 112 when assembled. The main body 114 is cylindrical in shape and extends between and connects the first screen 110 and the second screen 112 when assembled such that the first and second screens extend in parallel planes or substantially parallel planes, separated by at least a portion of the height of the main body 114. In other embodiments, the first and second screens 110, 112 may be square, rectangular, ovular, hexagonal, or the like. Whatever the shape of the screens 110, 112, the main body 114 may have a correspondingly shaped cross section taken in the plane, and/or a parallel or substantially parallel plane, of the screens 110, 112 when assembled. In some embodiments, the first and second screens 110, 112 may extend from the main body 114 in a dome shaped or convex manner. In other embodiments, the screens 110, 112 may extend into the main body 114 in a concave manner. These embodiments may provide greater surface area of the screen without increasing the dimensions of the main body 114.

In alternative embodiments, the first and second screens 110, 112 may be disposed in the assembly of the solvent reservoir filter 100 in non-parallel positions. For example, the screens may be disposed in a V-shape position. In this embodiment, the main body 114 may be fashioned or dimensioned such that the first and second screens 110, 112 are closer to each other on a first side of the solvent reservoir filter 100 and further from each other on a second opposite side of the solvent reservoir filter 100. The main body 114 may include a narrower side and may expand to a wider side to create the V-shaped orientation between the first and second screens 110, 112. Alternatively, the screens may be oriented at perpendicular angles to each other. For example, the first screen may be disposed at an angle to the second screen. The angle can be in the range of about 90 degrees to about 0 degrees, e.g., about 15 degrees, about 30 degrees or about 45 degrees. In some embodiments, the screens can be disposed at symmetrical angles about a primary plane of the main body, e.g., each screen may be disposed at the same angle from the primary plane of the main body, e.g., about 15 degrees from the primary plane for a total angle between the screens of about 30 degrees. The primary plane may be defined as a center plane of the main body 114, a plane of symmetry of the main body 114, or in the case of a non-symmetrical main body a plane wherein half of the volume of the main body 114 extends from the primary plane in a first direction, and half of the volume of the main body 114 extends from the primary plane in a second direction. In other embodiments, the screens can be disposed at asymmetrical angles about the primary plane of the main body, e.g., each screen may be disposed at different angles from the primary plane of the main body. For example, the first screen may be disposed parallel to the primary plane of the main body and the second screen may be disposed at a non-parallel angle to the second screen and the primary plane of the main body. In other examples, the first screen may be disposed at a first angle to the primary plane of the main body and the second screen may be disposed at a second angle to the primary plane of the main body, the second angle being greater than the first angle.

The first and second screens 110, 112 may each be made of woven metallic wire. For example, the first and second screens 110, 112 may each include a Plain weave, a Dutch weave, a Twilled weave, or a Twilled Dutch weave. The first and second screens 110, 112 may be woven from strands of metallic wire. The weaves may provide a controlled opening size such that particulates greater than 10 µm are prevented from passing through the woven screens 110, 112. In other embodiments, the weaves may prevent particulates greater than 5 µm from passing through the woven screens 110, 112. In still other embodiments, the weaves may prevent particulates greater than 20 µm or more from passing through the woven screens 110, 112. The screens 110, 112 may be made of stainless steel (such as 316 SS), titanium, and/or alloys thereof, for example. The screens 110, 112 may be fully passivated with an inert surface coating on one or both sides, in one embodiment. While woven wire screens are contemplated, in other embodiments, the screens may be sintered screens, or even not metallic screens.

The main body 114 is shown including a first compression interface 118 and a second compression interface 120. The first and second compression interfaces 118, 120 are shown in FIG. 1 prior to being compressed in an uncompressed state. The first and second compression interfaces 118, 120 may each extend circumferentially around an entirety of the outer circumference of the cylindrical main body 114. The first compression interface 118 is shown located above the second compression interface 120. The first and second compression interfaces 118, 120 may divide the main body 114 into a first portion 122, a second portion 124 and a third portion 126.

Figure 7:
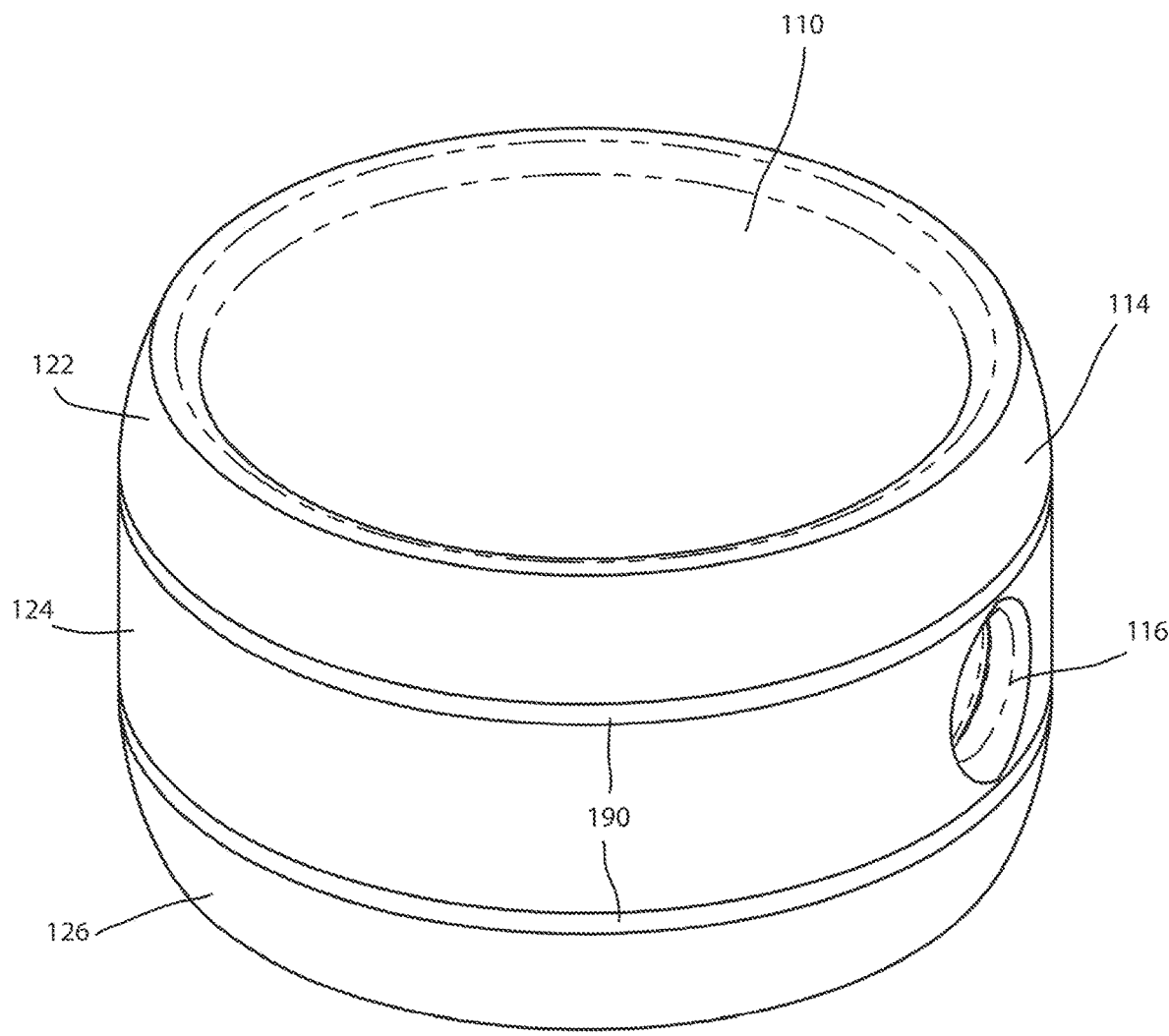
FIG. 7 depicts a perspective view of the solvent reservoir filter of FIG. 1 after compression, in accordance with one embodiment.

During compression, the first portion 122 and the third portion 126 may be compressed onto the second portion 124, as shown in FIG. 7 and described herein below. Prior to compression, the first and second screens 110, 112 may be received within inner channels 128, 129 of the compression interfaces 118, 120, respectively. The first compression interface 118 is shown including an inner channel 128 that is internal to the main body 114. The second compression interface 120 may also include a corresponding inner channel 129 (shown in FIG. 3) that is internal to the main body 114 and may be dimensionally equivalent to the inner channel 128. The first and second screens 110, 112 may be flexible to be flexibly urged into the inner channels 128, 129 of the compression interfaces 118, 120, respectively. Compression of the first and third portions 122, 126 into the second portion 124 may be configured to retain, hold, attach and/or affix the first and second screens 110, 112 to the main body 114.

As shown, the main body 114 includes a first shelf 130. The first shelf 130 may be located a distance under the inner channel 128 of the compression interfaces 118 within the main body 114 of the solvent reservoir filter 100. The main body 114 may further include a second shelf 132 (shown in FIG. 3) located the same distance above the inner channel 129. The distance may be at or about, for example, 0.05 inches (i.e. closer to 0.05 inches than 0.06 inches or 0.04 inches). Whatever the distance, the distance may define a thickness of each of the shelves 130, 132, such that the shelves 130, 132 may be configured to clear out trapped air bubbles during the priming of the solvent reservoir filter 100. The first and second shelves 130, 132 may be configured to create a space defined by the distance between the shelves 130, 132 and the received screens 110, 112, respectively. Thus, the first shelf 130 may be located the distance behind the first screen 110 and the second shelf 132 may be located the distance behind the second screen 112. The distance may be greater or smaller than 0.05 inches in various embodiments. Whatever the distance, the shelf cavity may be dimensioned to facilitate bubble clearing.

As shown, the main body 114 includes a first shelf 130. The first shelf 130 may be located a first distance under the inner channel 128 of the compression interfaces 118 within the main body 114 of the solvent reservoir filter 100. The main body 114 may further include a second shelf 132 (shown in FIG. 3) located the same first distance above the inner channel 129. The first distance may be at or about, for example, 0.05 inches (i.e. closer to 0.05 inches than 0.06 inches or 0.04 inches). Whatever the first distance, the first distance may define a thickness of each of the shelves 130, 132, such that the shelves 130, 132 may be configured to clear out trapped air bubbles during the priming of the solvent reservoir filter 100. The first and second shelves 130, 132 may be configured to create a space defined by the first distance between the shelves 130, 132 and the received screens 110, 112, respectively. Thus, the first shelf 130 may be located the first distance behind the first screen 110 and the second shelf 132 may be located the first distance behind the second screen 112. The distance may be greater or smaller than the distance, the shelf cavity may be dimensioned to facilitate bubble clearing.

The main body 114 may further include an internal fluidic passage 134 extending perpendicular to each of the attached first and second screens 110, 112 and from the shelves 130, 132. The internal fluidic passage 134 may be at or about 0.05 inches in diameter (i.e. closer to 0.05 inches than 0.06 or 0.04 inches), in one embodiment. The diameter may be greater or smaller than 0.05 inches in various embodiments. Whatever the diameter, the internal fluidic passage may be configured to facilitate bubble clearing.

The internal fluidic passage 134 may be located at a location that is off-center relative from a center 135a, 135b of each of the first and second screens and from a center 135c of the main body 114. The internal fluidic passage 134 may be located proximate a first side 136 of an outer surface of the main body 114. The fluid outlet 116 may be located on a second side 138 of an outer surface of the main body 114. The second side 138 may be an opposite side of the main body 114 from the first side 136. The off-center location of the internal fluidic passage 134 may be configured to allow the solvent reservoir filter 100 to continue to receive solvent to a lower level of solvent in a solvent reservoir when the second side 138 (which includes the fluidic outlet 116 and attached tube) is facing upward and the first side 136 is facing downward during use. This may allow the solvent reservoir filter 100 to continue to maintain flow longer as the solvent level in a bottle or other solvent reservoir decreases. In still other embodiment, the internal fluidic passage 134 may be on-center, or even further from center (i.e. closer to the first side 136) than the embodiment shown.

Figure 2:
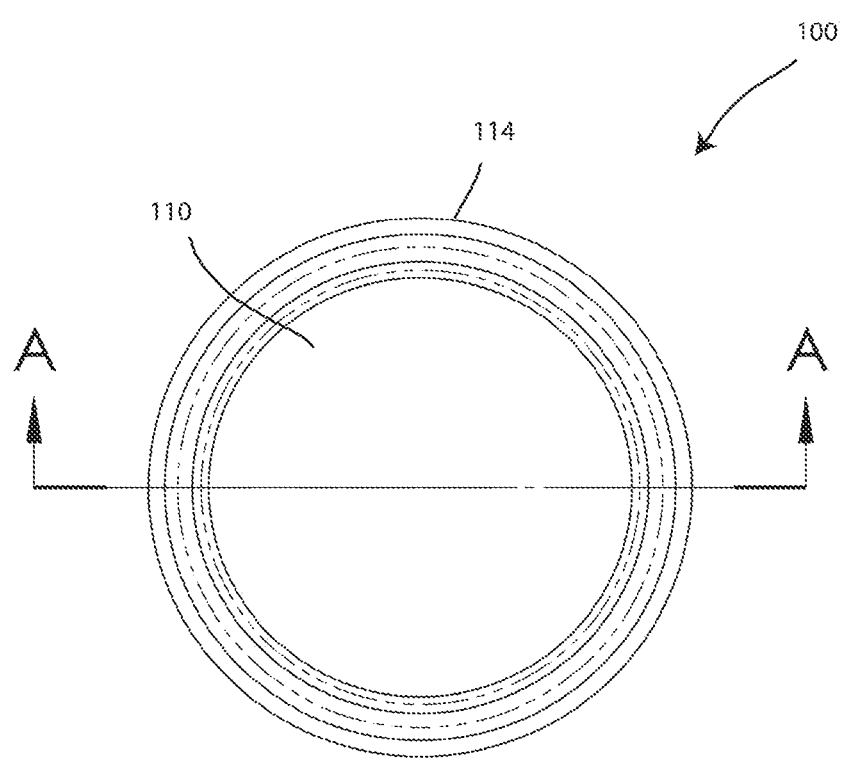
FIG. 2 depicts a top view of the solvent reservoir filter of FIG. 1, in accordance with one embodiment.

FIG. 2 depicts a top view of the solvent reservoir filter 100 of FIG. 1, in accordance with one embodiment. The top screen 110 is shown received by the inner channels 128 of the first compression interface 118 of the main body 114, thereby hiding the first shelf 130 and the internal fluidic passage 134.

Figure 3:
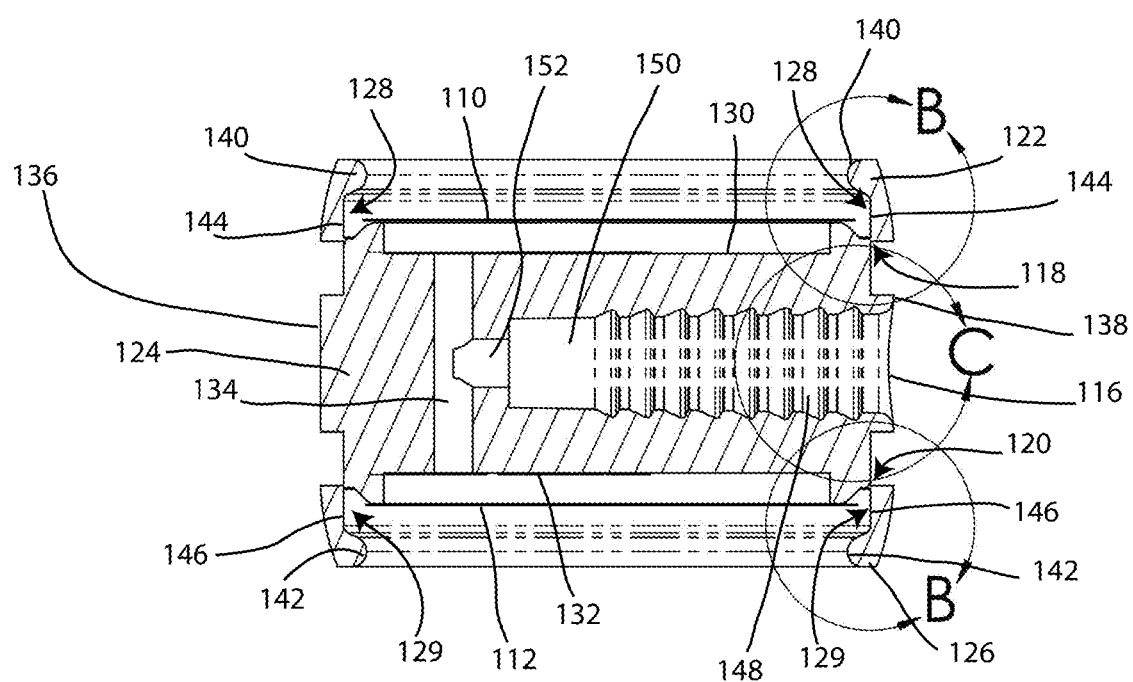
FIG. 3 depicts a cross sectional view, taken at arrows A-A of FIG. 2, in accordance with one embodiment.

FIG. 3 depicts a cross sectional view, taken at arrows A-A of FIG. 2, in accordance with one embodiment. As shown, the screens 110, 112 each are each within the inner channels 128, 129 of the first and second compression interfaces 118, 120, respectively. The first screen 110 may have a larger circumference than an outer edge 140 of the first inner channel 128 of the first compression interface 118, while the second screen 112 may similarly have a larger circumference than an outer edge 142 of the second inner channel 129 of the second compression interface 120. However, the first and second screens 110, 112 may have a smaller circumference than respective bottoms 144, 146 of the first and second inner channels 128, 129. In other embodiments, the screens 110, 112 may have an equal circumference to the circumference of the respective bottoms 144, 146 of the first and second inner channels 128, 129. In still other embodiments, the screens 110, 112 may have a greater circumference to the circumference of the respective bottoms 144, 146 of the first and second inner channels 128, 129 prior to compression but may be biased outwardly after compression to maintain a tight and/or stretched state.

As shown, the internal fluidic passage 134 may extend through each of the first and second shelves 130, 132. Thus, solvent received through each of the first and second screens 110, 112 may flow from the cavity, room or space defined by the screens 110, 112 and the shelves 130, 132 and through the internal fluidic passage 134. The fluidic outlet 116 may extend into the solvent reservoir filter 100 from an opening in the main body 114 and through the main body 114 in a parallel manner to the first and second screens 110, 112. The fluidic outlet 116 may extend into the internal fluidic passage 134. Thus, the solvent received into the internal fluidic passage 134 may pass from there into the fluidic outlet 116.

The fluidic outlet 116 may include an internal female tapered barb portion 148. The internal female tapered barb portion 148 may extend to a cylindrical portion 150 that includes a smooth outer surface. A connection portion 152 may connect the fluidic outlet 116 with the internal fluidic passage 134.

Figure 4A:
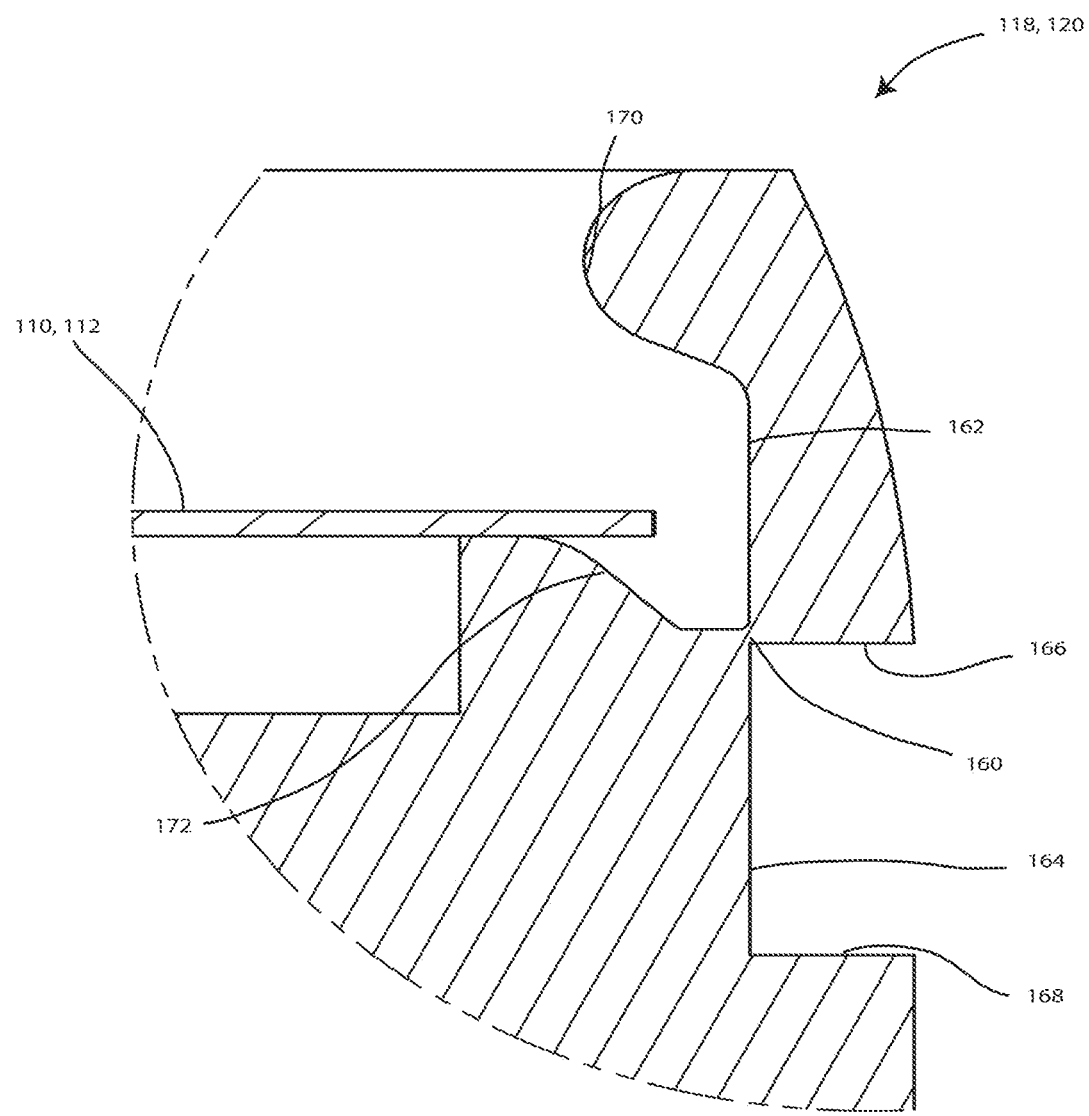
FIG. 4A depicts an enlarged view of a compression interface prior to compression, taken at circle B of FIG. 3, in accordance with one embodiment.

FIG. 4A depicts an enlarged view of one of the compression interfaces 118, 120 taken at one of the circles B of FIG. 3 prior to compression, in accordance with one embodiment. The compression interfaces 118, 120 enclosed by the circles B of FIG. 3 are dimensionally equivalent. The top compression interface may be the same, dimensionally, compared to the bottom compression interface. The compression interface 118, 120 is shown including an integrated shear joint 160. The integrated shear joints 160 (i.e. the joint between the first and second portions 122, 124 and the joint between the second and third portions 124, 126) may each extend about the circumference of the main body 114. The integrated shear joint 160 may be configured to permanently break as the first portion 122 and/or third portion 126 of the main body 114 are compressed into the second portion 124. The integrated shear joint 160 may include a 0.003" web thickness, for example. In other embodiments, a greater or smaller web thickness is contemplated. The integrated shear joint 160 may be configured to be broken at a predetermined amount of compressive force. In one embodiment, a press providing 600 pounds of force may be sufficient to shear through the webs of each of the shear joints 160 and compress the first and second compression interfaces 118, 120. In other embodiments, more or less than 600 pounds of compressive force may be required. The amount of required compressive force may be sufficient to prevent accidental compression by hand, in one embodiment.

Figure 4B:
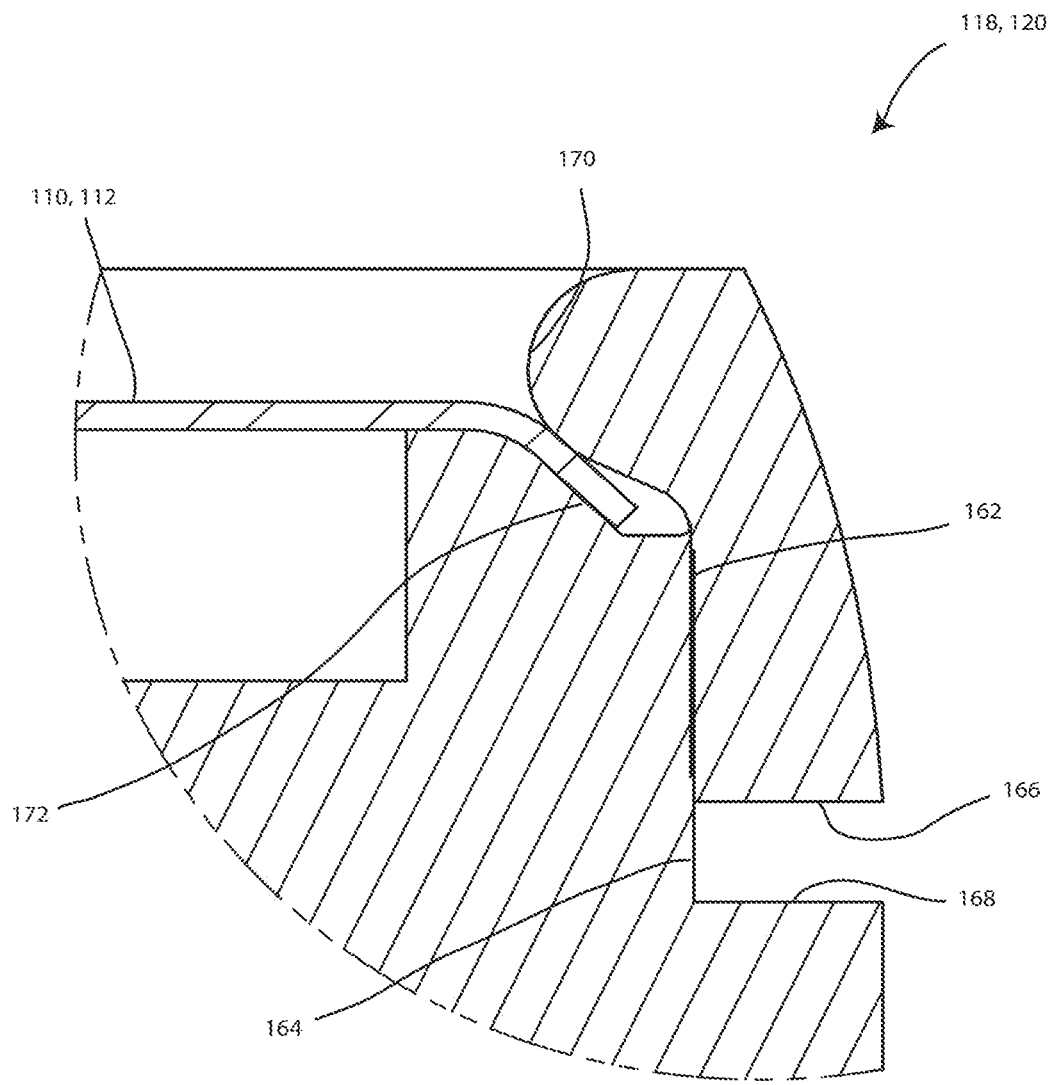
FIG. 4B depicts an enlarged view of the compression interface of FIG. 4A after compression, in accordance with one embodiment.

FIG. 4B depicts an enlarged view of the compression interface 118, 120 after compression, and after the integrated shear joint 160 has been broken, in accordance with one embodiment. With the integrated shear joint 160 broken, a flat inner surface 162 of the first or third portion 122, 126 creates an interference or press-fit with a flat outer surface 164 of the second portion 124. The screen 110, 112 may be compressed between a first convex lip 170 of the first or third portion 122, 126 and a second convex lip 172 of the second portion 124. The compression may bias the screen 110, 112 outward to create a convex shape relative to the outside of the solvent reservoir filter 100. However, this convex shape may be located around the edges of the screens 110, 112 proximate the integrated shear joints 160. The main portion of the first and second screens 110, 112 remain extending in a planar or substantially planar manner after compression. After compression, a bottom 166 of the compressed first or third portion 122, 126 may remain apart from a shelf 168 of the second portion 124. In other embodiments, the bottom 166 of the compressed first or third portion 122, 126 may abut the shelf 168 of the second portion 124. Thus, the shelf 168 may provide a guide to enable a compressor to know when the interference fit is tight enough—i.e. when the bottom 166 abuts the shelf 168.

Thus, the entirety of the main body 114 may be made of a single material. In one embodiment, the entirety of the main body 114 may be formed from a single mold. In another embodiment, the entirety of the main body 114 may be machined from a single piece of material. In other embodiments, it is contemplated that the first portion 122, the second portion 124 and the third portion 126 of the main body 114 may be comprised of three separate components that are arranged or otherwise aligned in the manner shown, and squeezed together into an interference or press-fit relationship. However, the single material embodiment may aid in assembly and ensure proper alignment. In still another embodiment, the first portion 122, the second portion 124 and the third portion 126 of the main body 114 may each be separate components and may be screwed together. For example, the first and third portions 122, 126 may each include internal threads while the second portion 124 may include a top set of external threads and a bottom set of internal threads configured to receive the internal threads of the first and third portions 122, 126.

Figure 5:
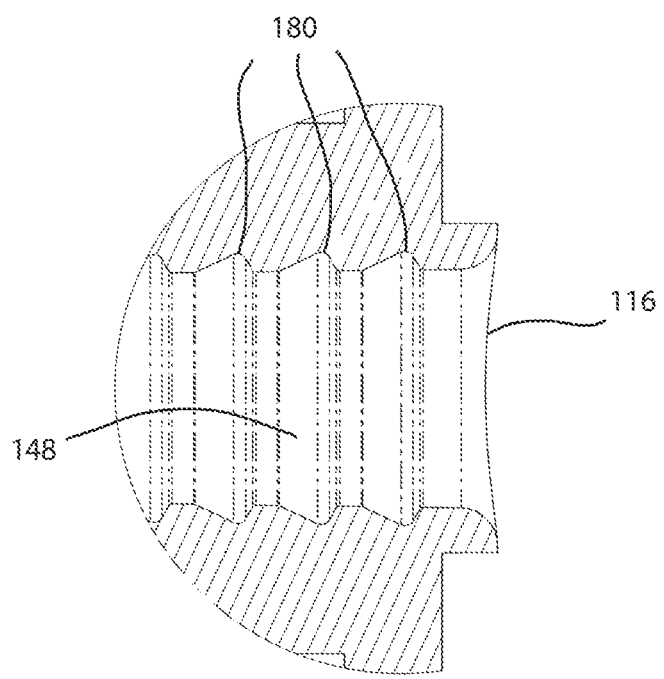
FIG. 5 depicts an enlarged view of a fluidic outlet, taken at circle C of FIG. 3, in accordance with one embodiment.

FIG. 5 depicts an enlarged view of the fluidic outlet 116, taken at circle C of FIG. 3, in accordance with one embodiment. As shown the fluidic outlet 116 includes the internal female tapered barb portion 148 that includes a plurality of internal tapered barbs 180. Thus, the fluidic outlet 116 may be a tube receiving interface extending from an outer surface of the main body 114 into the main body 114. The internal female tapered barb portion 148 and internal tapered barbs 180 may allow for a tube to be insertably retained and connected into the fluidic outlet 116. The internal female tapered barb portion 148 may provide for insertion and securing of ⅛" Tefzel® tubing, for example, although other types of tubes and dimensions are contemplated. In other embodiments, the fluidic outlet 116 may not include a female barbed tubing connection, but may instead be a male barbed portion extending from outside the main body 114. In still other embodiments, the fluidic outlet 116 may be a female tapered portion without barbs. In still other embodiments, the fluidic outlet 116 may include a female threaded portion configured to receive a male threaded tube. In still other embodiments, the fluidic outlet 116 may include a male tube extending from the main body 114 without any barbs. Still other connection interfaces are contemplated. Whatever the embodiment, the fluidic outlet 116 may provide for a secure fluidic connection with a tube, conduit, channel or passage for providing solvent from the solvent reservoir filter 100 to a liquid chromatography system.

Figure 6:
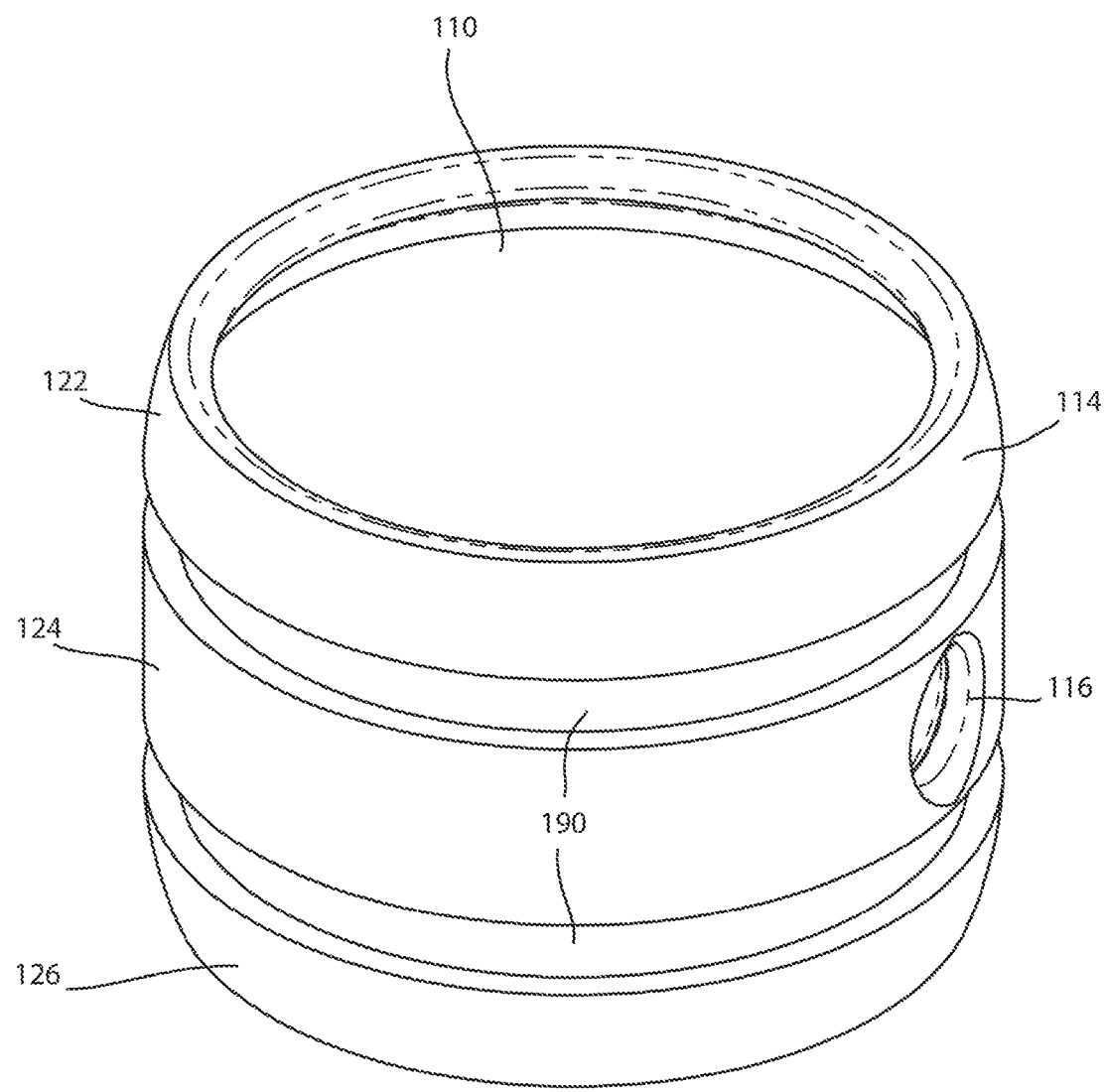
FIG. 6 depicts a perspective view of the solvent reservoir filter of FIG. 1 before compression, in accordance with one embodiment.

FIG. 6 depicts a perspective view of the solvent reservoir filter 100 before compression, in accordance with one embodiment. As shown, the solvent reservoir filter 100 includes the screens 110, 112 each received in respective inner channels 128, 129. The first portion 122 of the main body 114 and the third portion 126 of the main body 114 remain separated from the second portion 124 by gaps 190. The gaps 190 remain large in the decompressed state, defined by the height of the flat outer surface 164 of the second portion 124 (shown in FIG. 4A, 4B). FIG. 7 depicts a perspective view of the solvent reservoir filter of 100 after compression, in accordance with one embodiment. The first portion 122 of the main body 114 and the third portion of the main body 114 are now compressed relative to the second portion 124. The gaps 190 have been reduced in the compressed state. Such compression may be performed by hand, or by a press tool configured to apply a proper amount of compression on the solvent reservoir filter 100. This assembly process may be completed prior to providing the solvent reservoir filter 100 to a customer, in one embodiment.

While the embodiment shown of the solvent reservoir filter 100 includes two screens 110, 120, other embodiments may include a single screen. For example, the main body of such a solvent reservoir filter may include the capability of receiving, attaching, or otherwise incorporating a single screen, similar or the same as one of the screens 110, 120 with a single compressible integrated shear joint, similar or the same as the integrated shear joints 160, extending about the main body. The opposite side of the main body from the single screen solvent reservoir filter may be enclosed and not allow for the passage of fluid. In this embodiment, the fluidic outlet and tube connection may be attached to the main body in a similar location as that shown in the solvent reservoir filter 100. Alternatively, the fluidic outlet may be located on an opposite side of the main body from the single screen. In addition to single screen embodiments, more than two screens are also contemplated. For example, one embodiment may include three screens disposed in a triangular shape about a main body, or four screens disposed in a square or rectangular shape. Still further, solvent reservoir filters are contemplated having a main body with more than one joint or attachment location for multiple screens that forces solvent through multiple screens before reaching the fluidic outlet. For example, a solvent reservoir filter may include two integrated shear joints on each side of the main body, so that two pairs totaling four screens are attachable to the main body. In this embodiment, solvent may be required to flow through two screens before passing out of the fluidic outlet. The screens may have different mesh such that the first successive screen may be configured to filter out larger particles and the second successive screen may be configured to filter smaller particles. Such a four (or more) screen embodiment may include an extended main body height that may resemble the proportional dimensions of a full barrel. These embodiments may also include relative angles, symmetrical or asymmetrical, between the single screen and the primary plane of the main body, between the two or more screens and the primary plane of the main body, or between the two or more screens themselves, as discussed in more detail elsewhere herein.

Figure 8:
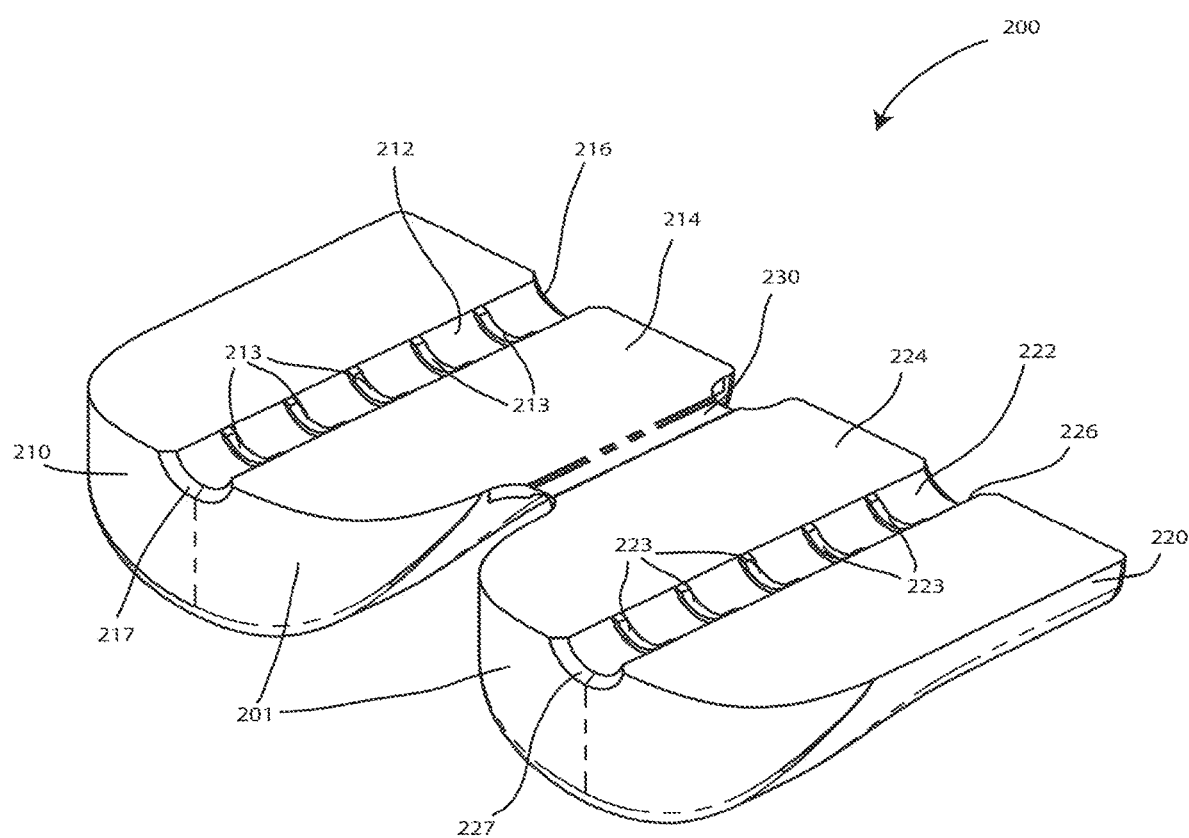
FIG. 8 depicts a first perspective view of an insertion tool in an open state, in accordance with one embodiment.
Figure 9:
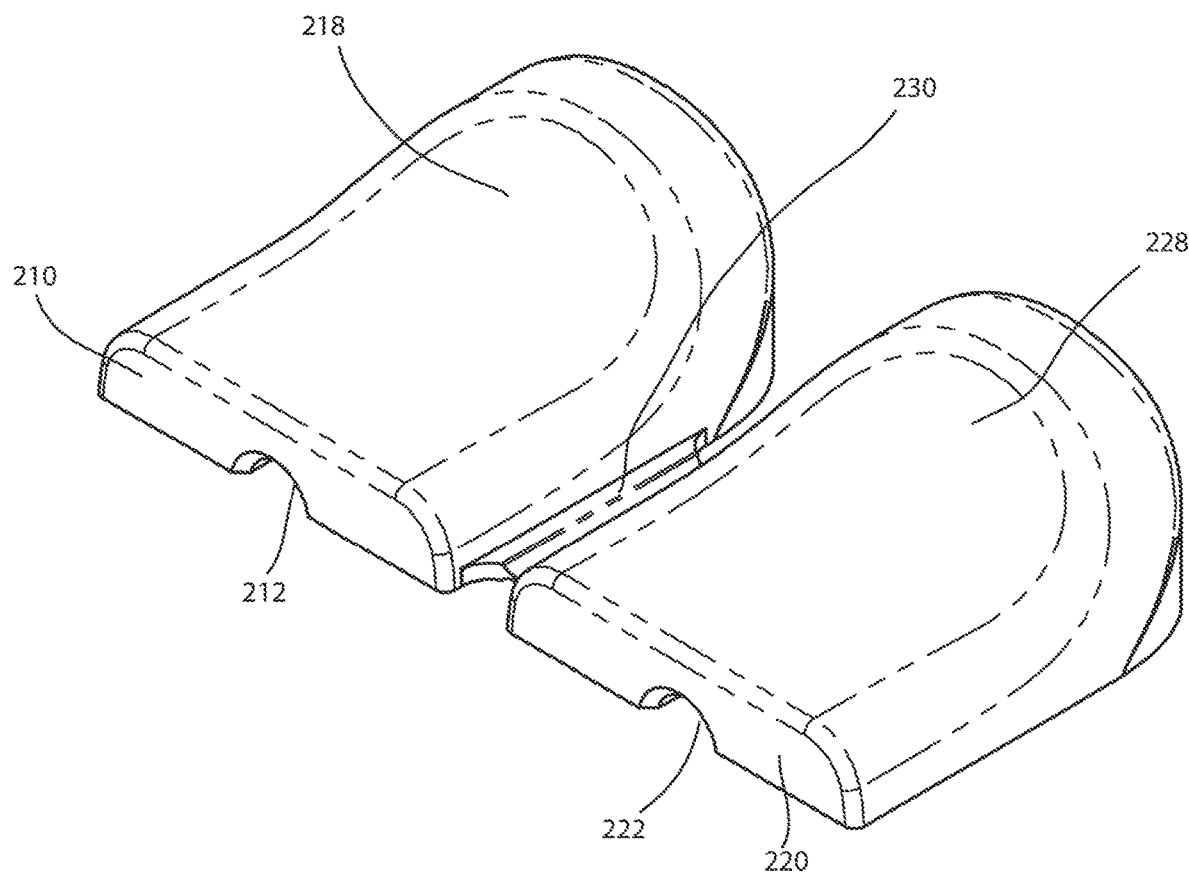
FIG. 9 depicts a second perspective view of the insertion tool of FIG. 8 in an open state, in accordance with one embodiment.
Figure 10:
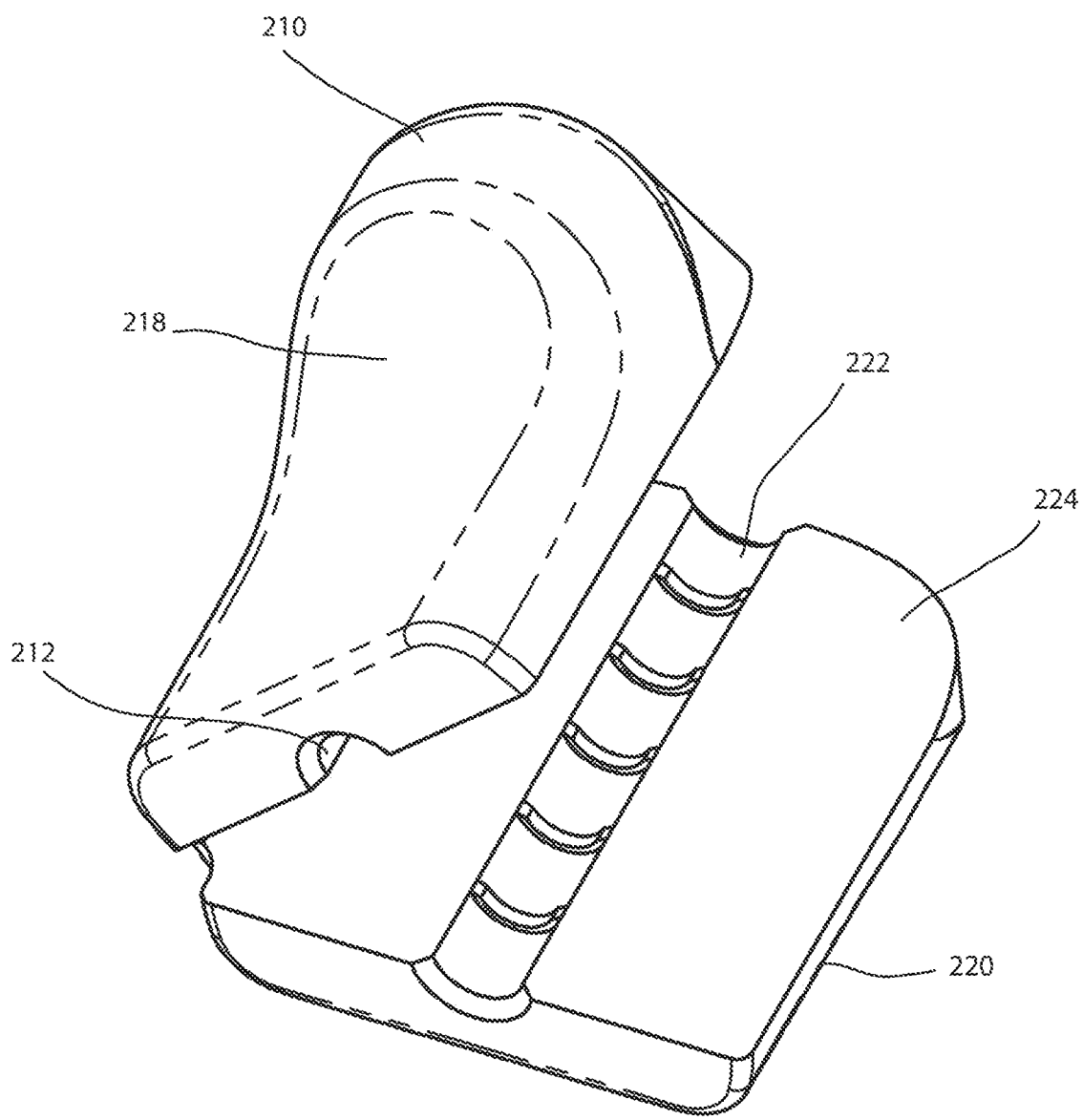
FIG. 10 depicts a second perspective view of the insertion tool of FIG. 8 in a partially closed state, in accordance with one embodiment.
Figure 11:
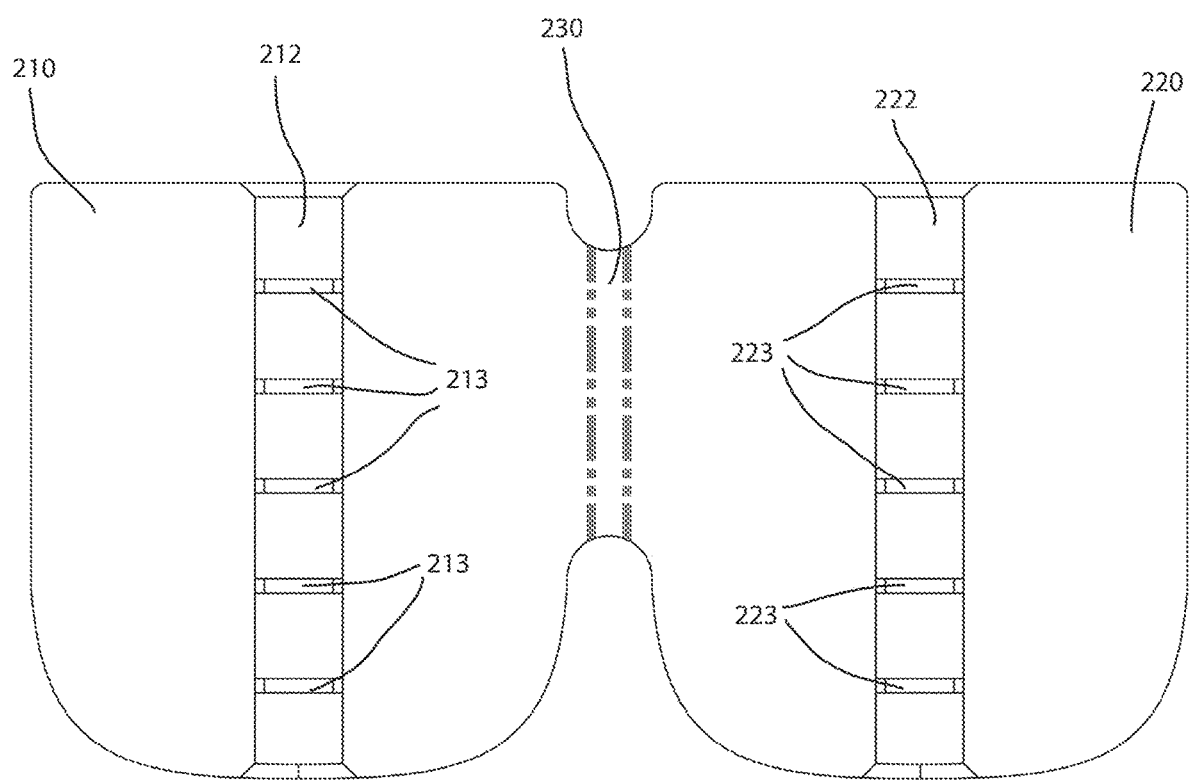
FIG. 11 depicts a top view of the insertion tool of FIG. 8 in an open state, in accordance with one embodiment.
Figure 12:
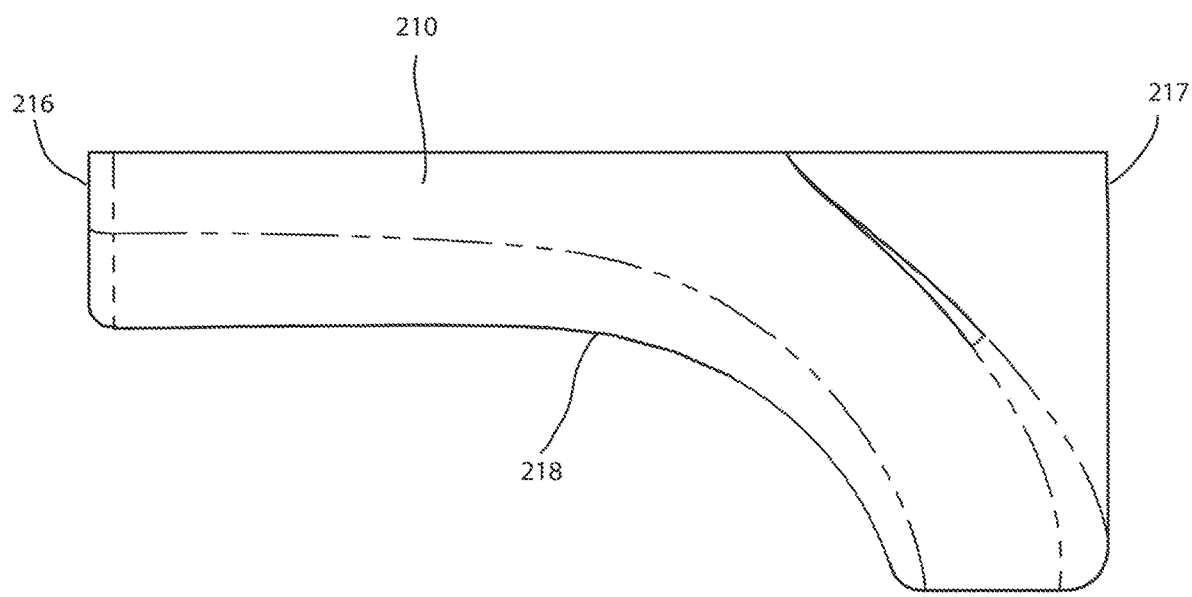
FIG. 12 depicts a left-side view of the insertion tool of FIG. 8 in an open state, in accordance with one embodiment.
Figure 13:
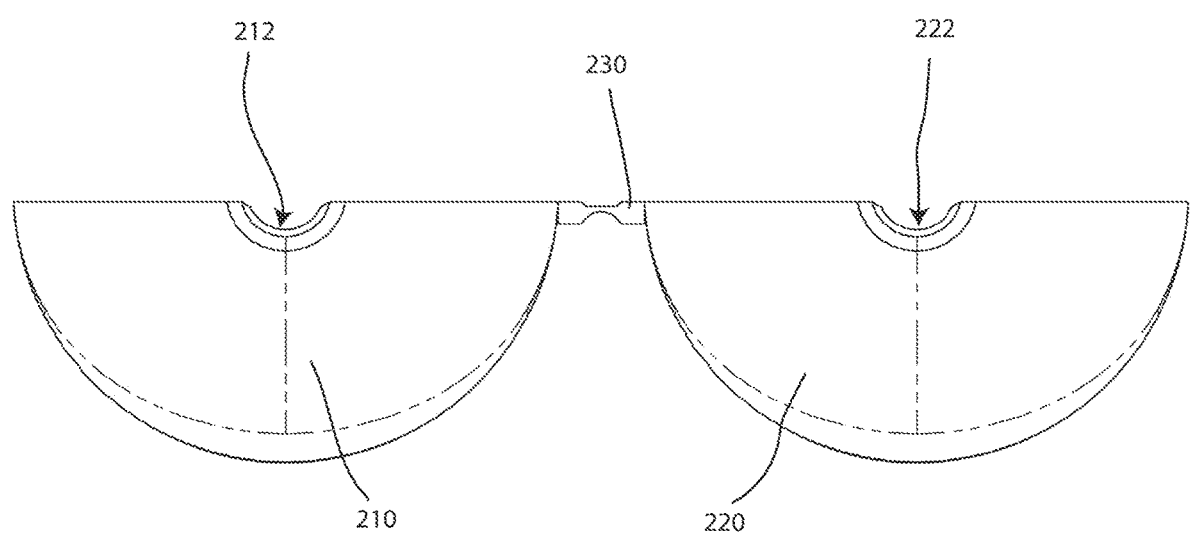
FIG. 13 depicts a front view of the insertion tool of FIG. 8 in an open state, in accordance with one embodiment.
Figure 14:
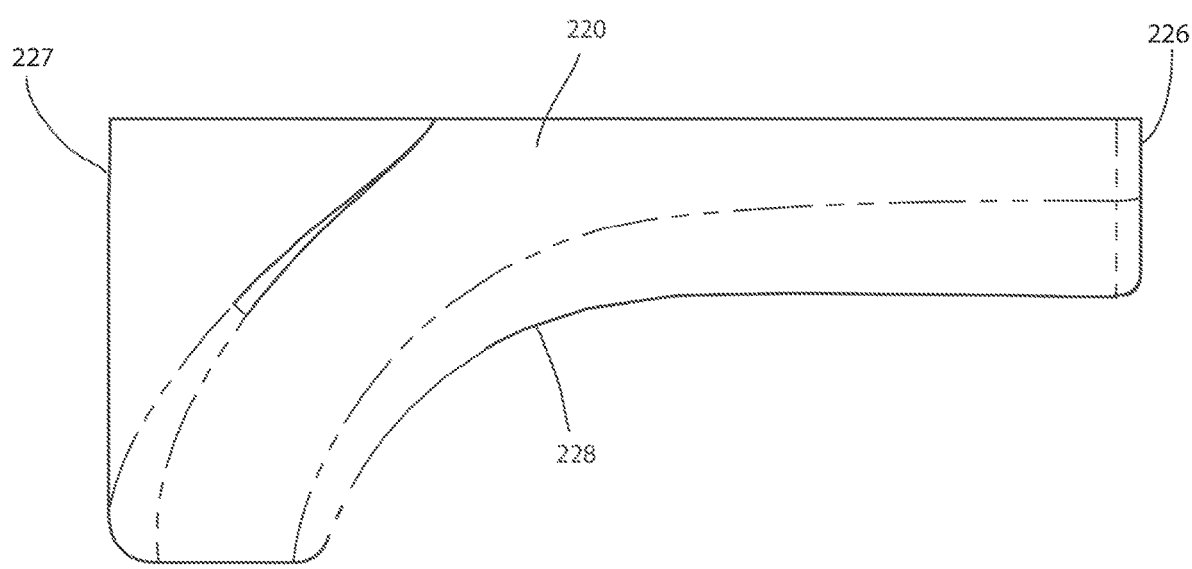
FIG. 14 depicts a right-side view of the insertion tool of FIG. 8 in an open state, in accordance with one embodiment.
Figure 15:
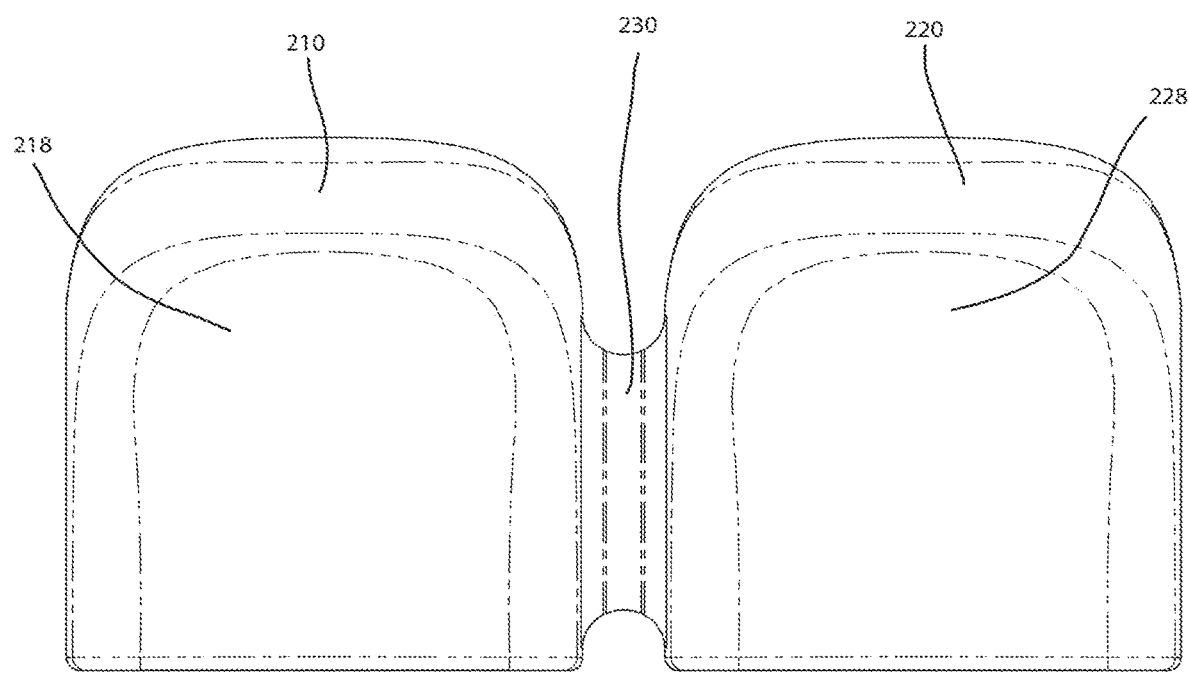
FIG. 15 depicts a bottom view of the insertion tool of FIG. 8 in an open state, in accordance with one embodiment.
Figure 16:
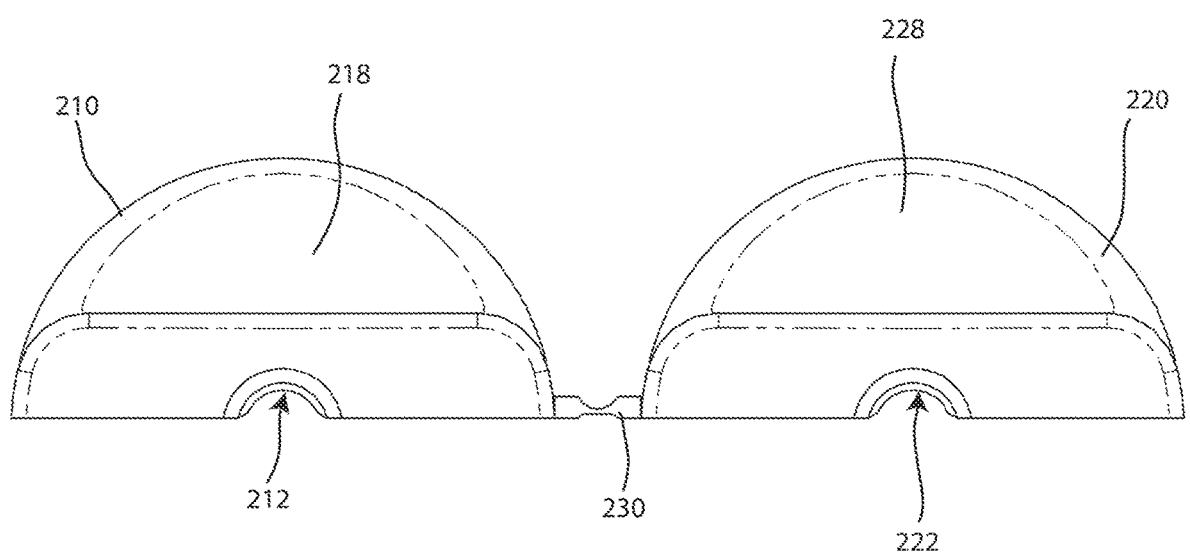
FIG. 16 depicts a rear view of the insertion tool of FIG. 8 in an open state, in accordance with one embodiment.

FIGS. 8-16 depict various views of an insertion tool 200, in accordance with one embodiment. In particular, FIG. 8 depicts a first perspective view of an insertion tool 200 in an open state, in accordance with one embodiment. FIG. 9 depicts a second perspective view of the insertion tool 200 in an open state, in accordance with one embodiment. FIG. 10 depicts a perspective view of the insertion tool 200 in a partially closed state, in accordance with one embodiment. FIG. 11 depicts a top view of the insertion tool 200 in an open state, in accordance with one embodiment. FIG. 12 depicts a left-side view of the insertion tool 200 in an open state, in accordance with one embodiment. FIG. 13 depicts a front view of the insertion tool 200 in an open state, in accordance with one embodiment. FIG. 14 depicts a right-side view of the insertion tool 200 in an open state, in accordance with one embodiment. FIG. 15 depicts a bottom view of the insertion tool 200 in an open state, in accordance with one embodiment. FIG. 16 depicts a rear view of the insertion tool 200 in an open state, in accordance with one embodiment.

The insertion tool 200 includes a main body 201 having first portion 210 and a second portion 220. The first portion 210 includes a first channel 212 extending across a first surface 214 between a first end 216 and a second end 217. The first channel 212 may be semi-circular in shape and may include a plurality of ribs 213. The plurality of ribs 213 may have a smaller radius than the rest of the first channel 212. The second portion 220 also includes a second channel 222 extending across a second surface 224 between a first end 226 and a second end 227. The second channel 222 may be semi-circular in shape and may include a plurality of ribs 223. The plurality of ribs 223 may have a smaller radius than the rest of the second channel 222. The first and second channels 212, 222 may be configured, contoured, or otherwise shaped to receive ⅛ inch diameter tubing, such as Tefzel® tubing. Thus, in the case the insertion tool 200 is configured for receiving ⅛ inch diameter Tefzel® tubing, the first and second plurality of ribs 213, 223 may cooperate when the first and second portions 210, 220 are hingedly closed, to form a ring having a diameter that is less than ⅛ inches. Other diameters are contemplated for the insertion tool 200 and the channels 212, 222 that accommodate tubing of various dimensions and sizes.

A hinge 230 may connect or hingedly attach the first portion 210 and the second portion 220 of the insertion tool 200. The hinge 230 may be a living hinge. The hinge 230 may be thin and/or flexible and may be made from the same material as the first and second portions 210, 220. The hinge 230 may be a thinned portion of material that is cut to allow the rigid first and second portions 210, 220 to flex or bend along a line of the hinge 230. The insertion tool 200 may be made of a single material, such as an elastomer, plastic such as polyethylene, or metal such as stainless steel. A combination of materials may alternatively be used through overmolding, for example. While the embodiment shown includes a living hinge 230, other embodiments are contemplated that might utilize a torsion spring. Such a design may require the insertion tool 200 to comprise three separate pieces: the first portion 210, the second portion 220, and the hinge 230.

The plurality of ribs 213, 223 in the first and second channels 212, 222 may be configured to indent and grip the received tube when the tube is inserted into the channels 212, 222 and the first and second portions 210, 220 are compressed with the hinge 230. The embodiment shown includes five ribs 213 and five ribs 223 that cooperate to form five compressive rings within the channels 212, 222. More or less than five ribs are contemplated. The rings may be made of a material that is at least as hard or harder than Tefzel® or at least as hard or harder than the material utilized for the solvent tubing. In one embodiment, the entirety of the insertion tool 200 may be made of the material that is as hard or harder than the material of the tubing. In another embodiment, the material of the ribs 213, 223 may be made of a harder material than the rest of the first and second portions 210, 220.

As shown in FIGS. 9 and 10, outer surfaces 218, 228 of each of the first and second portions 210, 220 of the insertion tool 200 may be ergonomically contoured to match the finger of a user. In particular, the outer surfaces 218, 228 may be dimensionally equivalent, and matching the curvature and size of the average thumb and/or index finger. These outer surfaces 218, 228 may be raised to facilitate gripping the tool during use.

In use, a user may place a length of tubing into one of the channels 212, 222 proximate, but not quite at, an end of the tube such that a small portion of the tube extends from the channel 212, 222. The first and second portions 210, 220 may be closed by the hinge. The tool may be gripped by the thumb and index finger of a user at the surfaces 218, 228 respectively. The grip applies pressure from the ribs 213, 223 to the tube within the channels 212, 222. The user may then forcibly insert the end of the tube that is extending from the channel 212, 222 into the fluidic outlet 116 such that the female tapered barb portion 148 grips and receives the tube. The insertion tool 200 may provide two or more times the pushing force through the increased grip, compared to inserting the tube into the fluidic outlet 116 by hand. The insertion tool 200 may facilitate the insertion of tube into female tapered barbs, male barbs, or any of the various connection mechanisms for connecting a tube to a fluidic outlet in a solvent reservoir filter.

FIG. 17 depicts a perspective view of the solvent reservoir filter 100 disposed within a solvent reservoir 200 containing solvent 210, in accordance with one embodiment. A tube 220 extends from the solvent reservoir filter and extends out of an opening of the solvent reservoir filter 100. As shown, the solvent reservoir filter 100 is positioned such that the fluidic outlet 116 and the second side 138 is facing upward, while the first side 136 is facing downward. This may be a natural resting position of the solvent reservoir filter 100 once the tube 220 has been attached. The internal fluidic passage 134 may be located proximate the bottom of the solvent reservoir 200 relative to the center of the solvent reservoir filter 100. As shown, the solvent reservoir 200 may be a glass or plastic container, bottle, jug or the like, containing a solvent that will be delivered to a liquid chromatography system. The solvent level is shown well over the solvent reservoir filter 100 such that negative pressure provided in the tube 220 will suck solvent into the main body of the solvent reservoir filter 100 through the screens and out the fluidic outlet through the tube 220.

FIG. 18 depicts a schematic view of a liquid chromatography system that includes a solvent delivery system including the solvent reservoir filter of FIG. 1, in accordance with one embodiment. FIG. 18 shows an embodiment of a liquid chromatography system 10 for separating a mixture into its constituents. The liquid chromatography system 10 includes a solvent delivery system 12 in fluidic communication with a sample manager 14 (also called an injector or an autosampler) through tubing 16. The sample manager 14 is in fluidic communication with a chromatographic column 18 and in mechanical communication with a sample organizer 19. The sample organizer 19 may be configured to store samples and provide stored samples to the sample manager 14 using an automated, robotic, or other mechanical moving process. A detector 21 for example, a mass spectrometer, is in fluidic communication with the column 18 to receive the elution.

The solvent delivery system 12 includes a pumping system 20 in fluidic communication with solvent reservoirs 22 from which the pumping system 20 draws solvents (liquid) through tubing 24. The solvent reservoirs 22 may comprise a plurality of the solvent reservoirs 200, described herein above. Each of the separate lines of the tubing 24 is connected to the solvent reservoir filter 100, as described herein above. In one embodiment, the pumping system 20 is embodied by a low-pressure mixing gradient pumping system having two pumps fluidically connected in series. In the low-pressure gradient pumping system, the mixing of solvents occurs before the pump, and the solvent delivery system 12 has a mixer 26 in fluidic communication with the solvent reservoirs 22 to receive various solvents in metered proportions. This mixing of solvents (mobile phase) composition that varies over time (i.e., the gradient).

The pumping system 20 is in fluidic communication with the mixer 26 to draw a continuous flow of gradient therefrom for delivery to the sample manager 14. Examples of solvent delivery systems that can be used to implement the solvent delivery system 12 include, but are not limited to, the ACQUITY Binary Solvent Manager and the ACQUITY Quaternary Solvent Manager, manufactured by Waters Corp. of Milford, Mass.

The sample manager 14 may include an injector valve 28 having a sample loop 30. The sample manager 14 may operate in one of two states: a load state and an injection state. In the load state, the position of the injector valve 28 is such that the sample manager loads the sample 32 into the sample loop 30. The sample 32 is drawn from a vial contained by a sample vial carrier or any device configured to carry a sample vial such as a well plate, sample vial carrier, or the like. In the injection state, the position of the injector valve 28 changes so that the sample manager 14 introduces the sample in the sample loop 30 into the continuously flowing mobile phase from the solvent delivery system. The mobile phase thus carries the sample into the column 18. In other embodiments, a flow through needle (FTN) may be utilized instead of a Fixed-Loop sample manager. Using an FTN approach, the sample may be pulled into the needle and then the needle may be moved into a seal. The valve may then be switched to make the needle in-line with the solvent delivery system.

The liquid chromatography system 10 may further include a data system 34 that is in signal communication with the solvent delivery system 12, the sample manager 14 and/or the sample organizer 19. The data system 34 may include a processor 36 and a switch 38 (e.g. an Ethernet switch) for handling signal communication between the solvent delivery system 12, the sample manager 14, and the sample organizer 19, and otherwise controlling these components of the liquid chromatography system 10. A host computing system 40 is in communication with the data system 34 by which a technician can download various parameters and profiles (e.g., an intake velocity profile) to the data system 34.

Further contemplated are methods of filtering solvent in a liquid chromatography system. In one embodiment, a method is contemplated that includes providing a solvent reservoir, such as the solvent reservoir 200, containing a solvent, such as the solvent 210. The method may include providing a solvent reservoir filter, such as the solvent reservoir filter 100, into the solvent reservoir. The solvent reservoir filter may include a first screen, such as the first screen 110, extending in a first plane. The solvent reservoir filter may include a second screen, such as the second screen 112, extending in a second plane that is parallel to the first plane. The solvent reservoir filter may include a main body, such as the main body 114, extending between and connecting the first screen and the second screen. The solvent reservoir filter may include a fluid outlet, such as the fluidic outlet 116.

The method may include attaching a tube, such as the tube 220, to the fluid outlet such that the tube extends out of the solvent reservoir and is connected to a liquid chromatography system, such as the liquid chromatography system 10. The method may include filtering, by each of the first and second screen, the solvent. The method may include receiving, by a cavity defined by the main body, such as one of the cavities defined between the respective shelves 130, 132 and screens 110, 112, or the cavity defined by the internal fluidic passage 134, the filtered solvent. The method may include expelling, by the fluid outlet through the tube, the filtered solvent from the solvent reservoir filter.

The method may further include positioning the solvent reservoir filter within the solvent reservoir such that an internal fluidic passage, such as the internal fluidic passage 134, is located closer to a bottom of the solvent reservoir than a center of each of the first and second screens. The method may include resting the solvent reservoir filter against a bottom of the solvent reservoir such that the main body contacts the bottom, and such that the first screen and the second screen do not contact the bottom.

The method may include providing a tube insertion tool, such as the tube insertion tool 200. The tube insertion tool may include a first portion, such as the first portion 210, including a first channel, such as the first channel 212. The tube insertion tool may include a second portion, such as the second portion 220, hingedly attached to the first portion, the second portion including a second channel, such as the second channel 222. The method may include closing the hinge, such as the hinge 230, such that the first and second channel align to form a single opening through which to receive a length of the tube. At least a portion, such as the ribs 213, 223, of the first and second channel has a smaller dimension than the tube. The method may include receiving the tube within the first and second channels when the hinge is in the closed state, gripping the tube with the smaller dimension of the channel, and pushing the received and gripped tube into the fluid outlet by pushing the tube insertion tool.

In still other embodiments, methods are contemplated for assembling a solvent reservoir filter for a liquid chromatography system. For example, a method of assembling a solvent reservoir filter, such as the solvent reservoir filter 100, for a liquid chromatography system, such as the liquid chromatography system 10, may include providing a main body, such as the main body 114, including a first integrated shear joint, such as the first integrated shear joint 160 of the first compression interface 118, extending about an outer perimeter of the main body, the first integrated shear joint including a first portion, such as the first portion 122 and a second portion, such as the second portion 124. The method may include providing a first screen, such as one of the screens 110, 112. The method may include inserting the first screen into the first integrated shear joint between the first portion and the second portion of the first integrated shear joint, for example within the first inner channel 128. The method may include compressing the first portion and the second portion of the first integrated shear joint to retain the first screen between the first portion and the second portion of the first integrated shear joint.

The main body may include a second integrated shear joint extending about an outer perimeter of the main body, the second integrated shear joint, such as the second integrated shear joint 160 of the second compression interface 120, extending about an outer perimeter of the main body, the second integrated shear joint including a first portion, such as the third portion 126 and a second portion, such as the second portion 124. The method may include providing a second screen, such as the other one of the screens 110, 112. The method may include inserting the second screen into the second integrated shear joint between the first portion and the second portion of the second integrated shear joint, for example within the second inner channel 129. The method may include compressing the first portion and the second portion of the second integrated shear joint to retain the second screen between the first portion and the second portion of the second integrated shear joint.

The method may include breaking apart, during the compressing, the first portion from the second portions of one or both of the first and second integrated shear joints. The method may include performing the compressing of the first and second portions of each of the first and second integrated shear joints simultaneously and by a compression press configured to compress the first and second integrated shear joints at a predetermined pressure.

Various other methods are contemplated such as compressing the integrated shear joints by hand without a press to break the integrated shear joints. Further, methods may include providing threads on the first portion, second portion and third portion. Methods may include screwing the first portion to the second portion and the second portion to the third portion to attach the screens within retaining channels.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A solvent reservoir filter for a liquid chromatography system comprising:
    a first screen configured to filter solvent received through the first screen;
    a second screen configured to filter solvent received through the second screen;
    a main body extending between and connecting the first screen and the second screen; and
    a fluid outlet configured to expel solvent filtered by the first and second screens from the solvent reservoir filter,
    wherein the main body further comprises a first integrated shear joint extending about a circumference of the main body, the first integrated shear joint having a first portion and a second portion compressed with a press-fit to retain the first screen between the first and second portions, wherein the main body further comprises a second integrated shear joint extending about the circumference, the second integrated shear joint having a third portion and a fourth portion compressed with a press-fit to retain the second screen between the third and fourth portions, wherein compression of the first and second integrated shear joints is configured to permanently break the shear joints into the press-fits.

2. The solvent reservoir filter of claim 1, wherein the first screen extends in a first plane, wherein the second screen extends in a second plane that is parallel or substantially parallel to the first plane.

3. The solvent reservoir filter of claim 1, wherein the first screen is circular in shape, wherein the second screen is circular in shape, and wherein the main body is cylindrical in shape.

4. The solvent reservoir filter of claim 1, wherein the first screen and the second screen each comprise woven wire.

5. The solvent reservoir filter of claim 1, wherein the fluid outlet is a tube receiving interface extending from an outer surface of the main body into the main body.

6. The solvent reservoir filter of claim 5, wherein the tube receiving interface includes at least one barb configured to attach an outlet tube to the fluid outlet.

7. The solvent reservoir filter of claim 1, wherein the main body further includes a first shelf located a distance behind the first screen and a second shelf located the distance behind the second screen.

8. The solvent reservoir filter of claim 1, wherein the main body further includes an internal fluidic passage extending perpendicular to each of the first and second screens, the internal fluidic passage extending at a location that is off-center relative from a center of each of the first and second screens.

9. The solvent reservoir filter of claim 8, wherein the internal fluidic passage is located proximate a first side of an outer surface of the main body, and wherein the fluid outlet is a tube receiving interface extending within the main body from a second side of the outer surface, the second side located opposite the first side.

10. The solvent reservoir filter of claim 1, wherein the entirety of the main body is made of a single material.

11. A method of filtering solvent in a liquid chromatography system, the method comprising:
   providing a solvent reservoir containing a solvent;
   providing a solvent reservoir filter for the liquid chromatography system the solvent reservoir filter comprising:
      a first screen configured to filter solvent received through the first screen;
      a second screen configured to filter solvent received through the second screen;
      a main body extending between and connecting the first screen and the second screen; and
      wherein the main body further comprises a first integrated shear joint extending about a circumference of the main body, the first integrated shear joint having a first portion and a second portion compressed with a press-fit to retain the first screen between the first and second portions, wherein the main body further comprises a second integrated shear joint extending about the circumference, the second integrated shear joint having a third portion and a fourth portion compressed with a press-fit to retain the second screen between the third and fourth portions, wherein compression of the first and second integrated shear joints is configured to permanently break the shear joints into the press-fits;
   providing the solvent reservoir filter into the solvent reservoir containing the solvent;
   attaching a tube to the fluid outlet such that the tube extends out of the solvent reservoir and is connected to the liquid chromatography system;
   filtering, by each of the first and second screen, the solvent;
   receiving, by a cavity defined by the main body, the filtered solvent;
   expelling, by the fluid outlet through the tube, the filtered solvent from the solvent reservoir filter.

12. The method of claim 11, wherein the first screen extends in a first plane, and wherein the second screen extends in a second plane that is parallel or substantially parallel to the first plane.

13. The method of claim 11, wherein the provided solvent reservoir filter further comprises:
   an internal fluidic passage extending perpendicular to each of the first and second screens,
   the method further comprising:
   positioning the solvent reservoir filter within the solvent reservoir such that the internal fluidic passage is located closer to a bottom of the solvent reservoir than a center of each of the first and second screens.

14. The method of claim 11, further comprising resting the solvent reservoir filter against a bottom of the solvent reservoir such that the main body contacts the bottom, and such that the first screen and the second screen do not contact the bottom.

15. The method of claim 11, wherein the attaching the tube to the fluid outlet further includes:
   providing a tube insertion tool comprising:
      a hinge;
      a first portion including a first channel; and
      a second portion hingedly attached to the first portion with the hinge, the second portion including a second channel, wherein when the hinge of the tube insertion tool is in a closed state, the first and second channel align to form a single opening through which to receive a length of the tube, wherein at least a portion of the first and second channel has a smaller dimension than the tube;
   receiving the tube within the first and second channels when the hinge is in the closed state;
   gripping the tube with the smaller dimension of the channel; and
   pushing the received and gripped tube into the fluid outlet by pushing the tube insertion tool.

16. A liquid chromatography system comprising:
   a solvent delivery system including:
      a solvent reservoir;
      a solvent reservoir filter comprising:
         a first screen configured to filter solvent received through the first screen;
         a second screen configured to filter solvent received through the second screen;
         a main body extending between and connecting the first screen and the second screen; and
         a fluid outlet configured to expel solvent filtered by the first and second screens from the solvent reservoir filter, wherein the main body further comprises a first integrated shear joint extending about a circumference of the main body, the first integrated shear joint having a first portion and a second portion compressed with a press-fit to retain the first screen between the first and second portions, wherein the main body further comprises a second integrated shear joint extending about the circumference, the second integrated shear joint having a third portion and a fourth portion compressed with a press-fit to retain the second screen between the third and fourth portions, wherein compression of the first and second integrated shear joints is configured to permanently break the shear joints into the press-fits; and
      a tube extending into the fluid outlet configured to receive solvent filtered by the solvent reservoir filter;
   a sample delivery system in fluidic communication with solvent delivery system;
   a liquid chromatography column located downstream from the solvent delivery system and the sample delivery system; and
   a detector located downstream from the liquid chromatography column.

* * * * *